US011388340B2

(12) United States Patent
Yamazaki

(10) Patent No.: US 11,388,340 B2
(45) Date of Patent: Jul. 12, 2022

(54) IMAGE PROCESSING DEVICE, IMAGE PROCESSING METHOD, AND IMAGE PROCESSING SYSTEM FOR IMAGE STABILIZATION

(71) Applicant: SONY SEMICONDUCTOR SOLUTIONS CORPORATION, Kanagawa (JP)

(72) Inventor: Mamoru Yamazaki, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 13 days.

(21) Appl. No.: 16/955,634

(22) PCT Filed: Dec. 26, 2018

(86) PCT No.: PCT/JP2018/047704
§ 371 (c)(1),
(2) Date: Jun. 18, 2020

(87) PCT Pub. No.: WO2019/138868
PCT Pub. Date: Jul. 18, 2019

(65) Prior Publication Data
US 2021/0014399 A1 Jan. 14, 2021

(30) Foreign Application Priority Data
Jan. 9, 2018 (JP) .............................. JP2018-001010

(51) Int. Cl.
*H04N 5/232* (2006.01)
*H04N 5/345* (2011.01)
*H04N 5/378* (2011.01)

(52) U.S. Cl.
CPC ....... *H04N 5/2327* (2013.01); *H04N 5/23254* (2013.01); *H04N 5/3454* (2013.01); *H04N 5/378* (2013.01)

(58) Field of Classification Search
CPC ............. H04N 5/2327; H04N 5/23254; H04N 5/3454; H04N 5/378; H04N 5/23274; H04N 5/23258
See application file for complete search history.

(56) References Cited

U.S. PATENT DOCUMENTS

2006/0017814 A1* 1/2006 Pinto .................... H04N 5/2327
348/208.4
2007/0195182 A1 8/2007 Ito
2016/0150158 A1* 5/2016 Hasan ................ H04N 5/23274
348/208.2

FOREIGN PATENT DOCUMENTS

JP 2007-228019 A 9/2007
JP 2015-173388 A 10/2015
WO 2014/156731 A1 10/2014

OTHER PUBLICATIONS

International Search Report and Written Opinion of PCT Application No. PCT/JP2018/047704, dated Feb. 19, 2019, 06 pages of ISRWO.

* cited by examiner

*Primary Examiner* — Nicholas G Giles
(74) *Attorney, Agent, or Firm* — Chip Law Group

(57) ABSTRACT

The present disclosure relates to an image processing device and method, and an image processing system that can suppress an increase in load due to image stabilization. A readout area, which is an area from which an image is read out, in an imaging area formed by a plurality of pixels is set on the basis of motion prediction information for a predetermined frame after a frame to be processed, and a cutout (Continued)

area to cut out a partial image from a readout image read out from the set readout area of the frame to be processed is set. The present disclosure can be applied to, for example, an image processing device, an imaging device, or an image processing system, or the like.

19 Claims, 25 Drawing Sheets

IMAGE PROCESSING DEVICE, IMAGE PROCESSING METHOD, AND IMAGE PROCESSING SYSTEM FOR IMAGE STABILIZATION

CROSS REFERENCE TO RELATED APPLICATIONS

This application is a U.S. National Phase of International Patent Application No. PCT/JP2018/047704 filed on Dec. 26, 2018, which claims priority benefit of Japanese Patent Application No. JP 2018-001010 filed in the Japan Patent Office on Jan. 9, 2018. Each of the above-referenced applications is hereby incorporated herein by reference in its entirety.

TECHNICAL FIELD

The present disclosure relates to an image processing device and method, and an image processing system, and more particularly relates to an image processing device and method and an image processing system capable of suppressing an increase in load due to image stabilization.

BACKGROUND ART

Conventionally, as a camera electronic image stabilization (EIS) shake correction technology, there has been a method of cutting out a partial image from an imaged image in response to motion (for example, see Patent Document 1).

CITATION LIST

Patent Document

Patent Document 1: International Publication No. 2014/156731

SUMMARY OF THE INVENTION

Problems to be Solved by the Invention

However, in the case of this method, in order to improve correction performance so as to be capable of stabilizing an image even with more intense motion, it is necessary to perform imaging using a sensor that has a larger pixel count, and to cut out a partial image from the imaged image. However, as the pixel count increases, a larger amount of data needs to be read out at a higher speed from the image sensor, and there has been a possibility that the load increases.

The present disclosure has been made in view of such a situation, and is intended to make it possible to suppress an increase in load due to image stabilization.

Solutions to Problems

An image processing device according to one aspect of the present technology is an image processing device including a readout area setting unit that sets a readout area, which is an area from which an image is read out, in an imaging area formed by a plurality of pixels on the basis of motion prediction information for a predetermined frame after a frame to be processed, and a cutout area setting unit that sets a cutout area to cut out a partial image from a readout image read out from the readout area of the frame to be processed set by the readout area setting unit.

An image processing method according to one aspect of the present technology is an image processing method including setting a readout area, which is an area from which an image is read out, in an imaging area formed by a plurality of pixels on the basis of motion prediction information for a predetermined frame after a frame to be processed, and setting a cutout area to cut out a partial image from a readout image read out from the readout area of the set frame to be processed.

An image processing system according to another aspect of the present technology is an image processing system including an imaging device that images a subject, and an image processing device that performs image processing, in which the image processing system further has a readout area setting unit that sets a readout area, which is an area from which an image is read out, in an imaging area formed by a plurality of pixels on the basis of motion prediction information for a predetermined frame after a frame to be processed, and a cutout area setting unit that sets a cutout area to cut out a partial image from a readout image read out from the readout area of the frame to be processed set by the readout area setting unit.

In an image processing device and method according to one aspect of the present technology, and in the image processing system, a readout area, which is an area from which an image is read out, in an imaging area formed by a plurality of pixels is set on the basis of motion prediction information for a predetermined frame after a frame to be processed, and a cutout area to cut out a partial image from a readout image read out from the set readout area of the frame to be processed is set.

Effects of the Invention

According to the present disclosure, an image can be processed. In particular, an increase in load due to image stabilization can be suppressed.

MODE FOR CARRYING OUT THE INVENTION

Hereinafter, modes for carrying out the present disclosure (hereinafter referred to as embodiments) will be described. Note that the description will be made in the following order.
1. Image stabilization
2. First embodiment (imaging device: image stabilization based on IMU data)
3. Second embodiment (imaging device: image stabilization based on motion vector)
4. Third embodiment (imaging device: data recording)
5. Fourth embodiment (image processing system)
6. Fifth embodiment (image processing device)
7. Sixth embodiment (stacked image sensor)
8. Appendix <1. Image Stabilization>
<EIS>

Conventionally, there is electronic image stabilization (EIS) as camera shake correction technology (image stabilization technology). In the EIS, an image is stabilized by cutting out a partial image in response to motion from each frame of an imaged image of a moving image.

Figure 1:
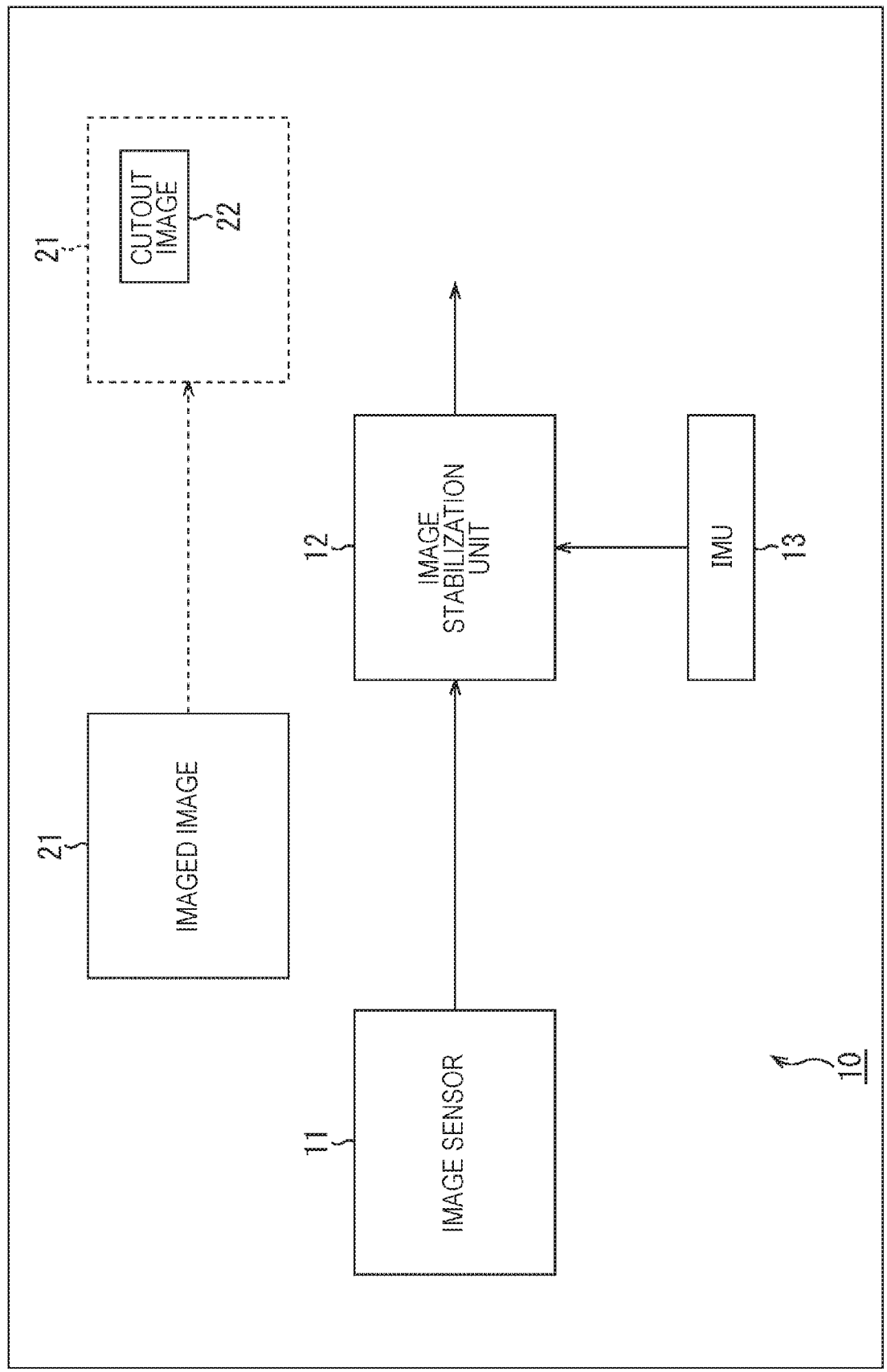
FIG. 1 is a diagram describing a conventional image stabilization method.

For example, as in an imaging device 10 illustrated in FIG. 1, the image sensor 11 images a subject to generate an imaged image 21 and supplies imaged image data thereof to an image stabilization unit 12. An inertial measurement unit (IMU) 13 measures angular velocities and accelerations of three axes of the imaging device 10 and supplies measurement data thereof to the image stabilization unit 12. The image stabilization unit 12 detects motion of the imaged image 21 due to motion of the imaging device 10 on the basis of the measurement data, and cuts out and outputs from the imaged image 21 a cutout image 22 that is a partial image thereof so as to suppress variation in position of the subject on the basis of the motion.

By performing such processing for each frame of the imaged image 21 of the moving image, it is possible to suppress shaking of the position of the subject due to motion of the imaging device 10, to thereby stabilize the image.

Generally, such processing is used to correct blur of the imaged image due to shaking of the hand holding the imaging device 10. In contrast, for example, in a case of a wearable device that is used by being worn on the body of the user, blur of an imaged image generally tends to be larger than that caused by such hand shake. Therefore, for example, as a shake correction (image stabilization) technology of an imaging device as such a wearable device, it is demanded to be capable of stabilizing larger shake.

To this end, in the case of the above-described method, it is sufficient if the cutout image 22 is cut out from the larger imaged image 21. At this time, if the resolution of the cutout image 22 to be output is not changed, the resolution of the imaged image 21 will be improved. That is, it is sufficient if imaging is performed using the image sensor 11 that has a larger pixel count.

However, as the pixel count of the image sensor 11 increases (that is, as the resolution of the imaged image 21 increases), it is necessary to read out a much larger amount of data at higher speed from the image sensor 11. That is, there has been a possibility that the load of reading data increases. More specifically, for example, it has been necessary to increase the bandwidth of an output interface. Accordingly, there has been a possibility that development and design costs increase. Furthermore, for example, there has also been a possibility that power consumption increases with high band data transfer.

In addition, even if the load increases in this manner, the resolution of the cutout image to be output does not change. That is, there has been a possibility that the load increases only for image stabilization (shake correction).

Accordingly, a readout area, which is an area from which an image is read out, in an imaging area formed by a plurality of pixels is set on the basis of motion prediction information for a predetermined frame after a frame to be processed, and a cutout area to cut out a partial image from a readout image read out from the set readout area of the frame to be processed is set.

For example, an image processing device includes a readout area setting unit that sets a readout area, which is an area from which an image is read out, in an imaging area formed by a plurality of pixels on the basis of motion prediction information for a predetermined frame after a frame to be processed, and a cutout area setting unit that sets a cutout area to cut out a partial image from a readout image read out from the readout area of the frame to be processed set by the readout area setting unit.

Furthermore, for example, an image processing system includes an imaging device that images a subject, and an image processing device that performs image processing, in which the image processing system further has a readout area setting unit that sets a readout area, which is an area from which an image is read out, in an imaging area formed by a plurality of pixels on the basis of motion prediction information for a predetermined frame after a frame to be processed, and a cutout area setting unit that sets a cutout area to cut out a partial image from a readout image read out from the readout area of the frame to be processed set by the readout area setting unit.

In this manner, it is possible to suppress an increase in the amount of data read out from the imaging area, and thus it is possible to suppress an increase in load due to image stabilization.

2. First Embodiment

<Imaging Device>

Figure 2:
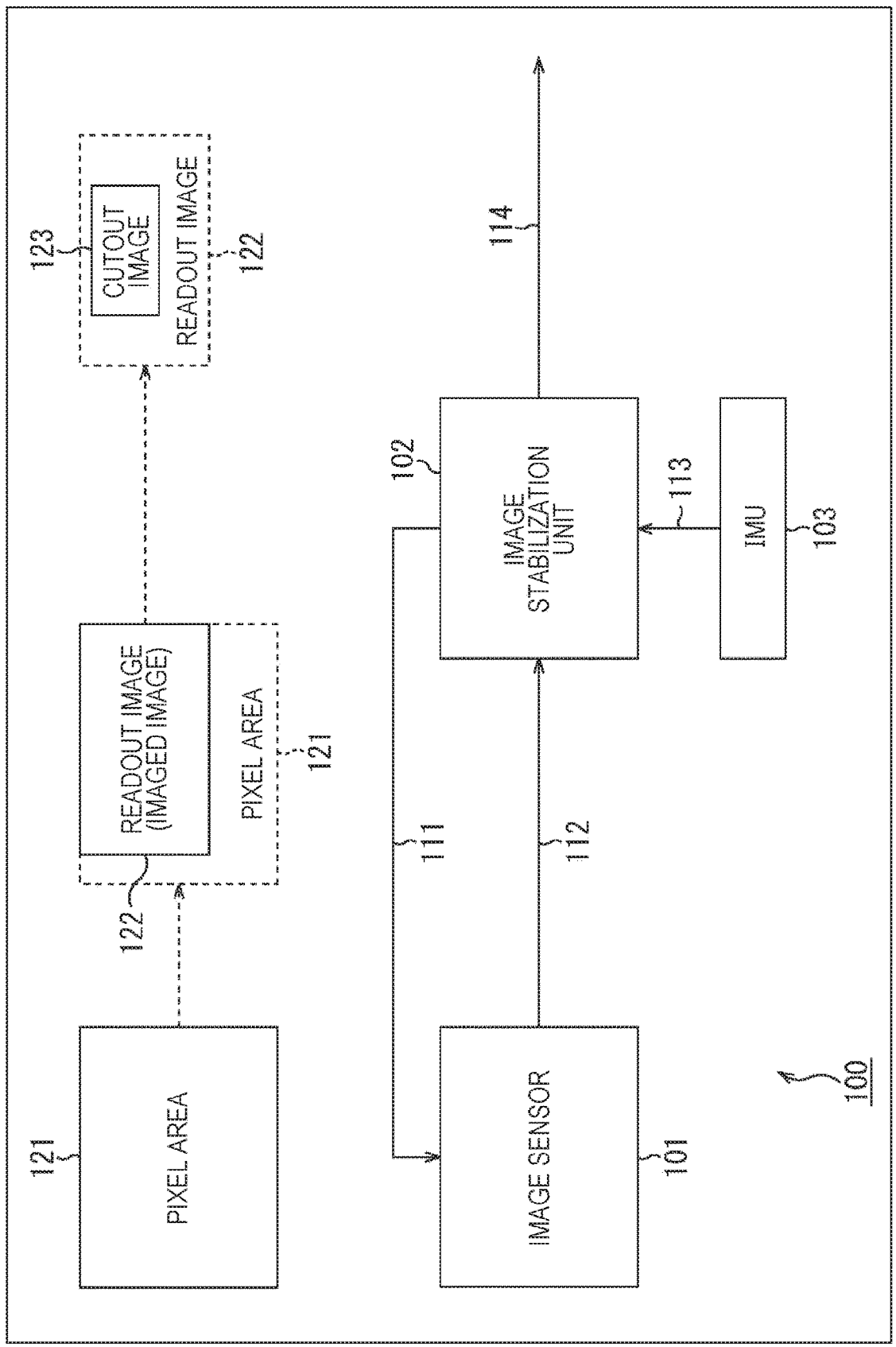
FIG. 2 is a block diagram illustrating a main configuration example of an imaging device.

FIG. 2 is a block diagram illustrating an example of a main configuration of an imaging device which is one mode of an image processing device to which the present technology is applied. An imaging device 100 illustrated in FIG. 2 is, for example, a device that images a subject in a moving image, performs an image stabilization process (shake correction) on an imaged image thereof, and outputs the imaged image.

Note that while FIG. 2 illustrates main elements such as a processing unit and a flow of data, the elements illustrated in FIG. 2 do not necessarily include all elements. That is, in the imaging device 100, a processing unit not illustrated as a block in FIG. 2 may exist, or a process or data flow not illustrated as an arrow or the like in FIG. 2 may exist.

As illustrated in FIG. 2, the imaging device 100 has an image sensor 101, an image stabilization unit 102, and an inertial measurement unit (IMU) 103.

The image sensor 101 is driven as an imaging unit, images a subject, and photoelectrically converts light from the subject to obtain an imaged image. The image sensor 101 has a pixel area 121 including a plurality of pixels as an imaging area for photoelectrically converting light from a subject. The image sensor 101 can drive an arbitrary range of the pixel area 121 to perform imaging, so as to generate an imaged image. This range is specified by the image stabilization unit 102 (arrow 111). For example, the image sensor 101 drives a part of the pixel area 121 specified by the image stabilization unit 102 as a readout area, so as to obtain a readout image 122.

The image sensor 101 supplies an obtained imaged image to the image stabilization unit 102 (arrow 112). For example, the image sensor 101 outputs the readout image 122 obtained in the readout area specified by the image stabilization unit 102 as an imaged image.

The IMU 103 is a measurement unit that measures motion and posture of the image sensor 101 (or the imaging device 100 including the image sensor 101). More specifically, the IMU 103 measures angular velocities and accelerations of three axes of the image sensor 101. The IMU 103 supplies measurement data (also referred to as IMU data) related to motion and posture of the image sensor 101 to the image stabilization unit 12 (arrow 113).

The image stabilization unit 102 performs a process related to image stabilization on an imaged image supplied from the image sensor 101. For example, the image stabilization unit 102 obtains an imaged image (readout image 122) supplied from the image sensor 101 (arrow 112). Furthermore, the image stabilization unit 102 obtains IMU data (angular velocities and accelerations of the three axes of the imaging device 100) supplied from the IMU 103.

The image stabilization unit 102 performs image stabilization on the obtained imaged image (readout image 122) on the basis of the obtained IMU data. More specifically, the image stabilization unit 102 detects motion of the readout image 122 due to motion of the imaging device 100 on the basis of the IMU data, and cuts out from the readout image 122 a cutout image 123 that is a partial image thereof so as to suppress variation in position of the subject on the basis of the motion.

The image stabilization unit 102 outputs the obtained cutout image 123 to the outside of the imaging device 100 (arrow 114).

Furthermore, the image stabilization unit 102 estimates IMU data corresponding to a predetermined frame (for example, a frame next to the current frame) after the current frame (frame to be processed) on the basis of the IMU data up to the present, estimates motion of the image sensor 101 up to the predetermined frame on the basis of the estimation result, and sets a readout area in the predetermined frame on the basis of the motion. That is, the image stabilization unit 102 predicts motion of the image sensor 101 up to a predetermined frame (that is, motion of the subject in the pixel area 121), and sets a position and a shape (including size and the like) of the readout area in the pixel area 121 so that the readout image 122 from which the cutout image 123 is obtained can be obtained in the predetermined frame. The image stabilization unit 102 supplies the setting of the readout area to the image sensor 101 (arrow 111).

The image sensor 101 obtains the readout image 122 of the readout area set in such manner by the image stabilization unit 102 in processing of the predetermined frame.

That is, in the imaging device 100, the readout image 122 obtained in the readout area that is a part of the pixel area 121 is read from the image sensor 101 as an imaged image. As illustrated in FIG. 2, this readout image 122 is smaller than an imaged image that is obtained by using the entire pixel area 121. Thus, an increase in the amount of data read from the image sensor 101 can be suppressed more than in a case where an image obtained in the entire pixel area 121 is read as an imaged image. Therefore, an increase in cost and an increase in power consumption due to expansion of the bandwidth of the output interface of the image sensor 101, and the like can be suppressed. In addition, also in the image stabilization unit 102 in a subsequent stage, an increase in cost and an increase in power consumption due to expansion of the bandwidth of the input interface and an increase in the memory capacity can be suppressed for a similar reason.

Furthermore, as illustrated in FIG. 2, this readout image 122 is larger than the cutout image 123 output from the imaging device 100. Then, as described above, the image stabilization unit 102 sets the readout area on the basis of the IMU data. Therefore, the cutout image 123 in which the image is stabilized (motion of the subject is suppressed) can be obtained from the readout image 122 obtained in the readout area. That is, the image stabilization can be performed using the readout image 122. That is, an increase in load due to image stabilization can be suppressed.

<Image Sensor>

Figure 3:
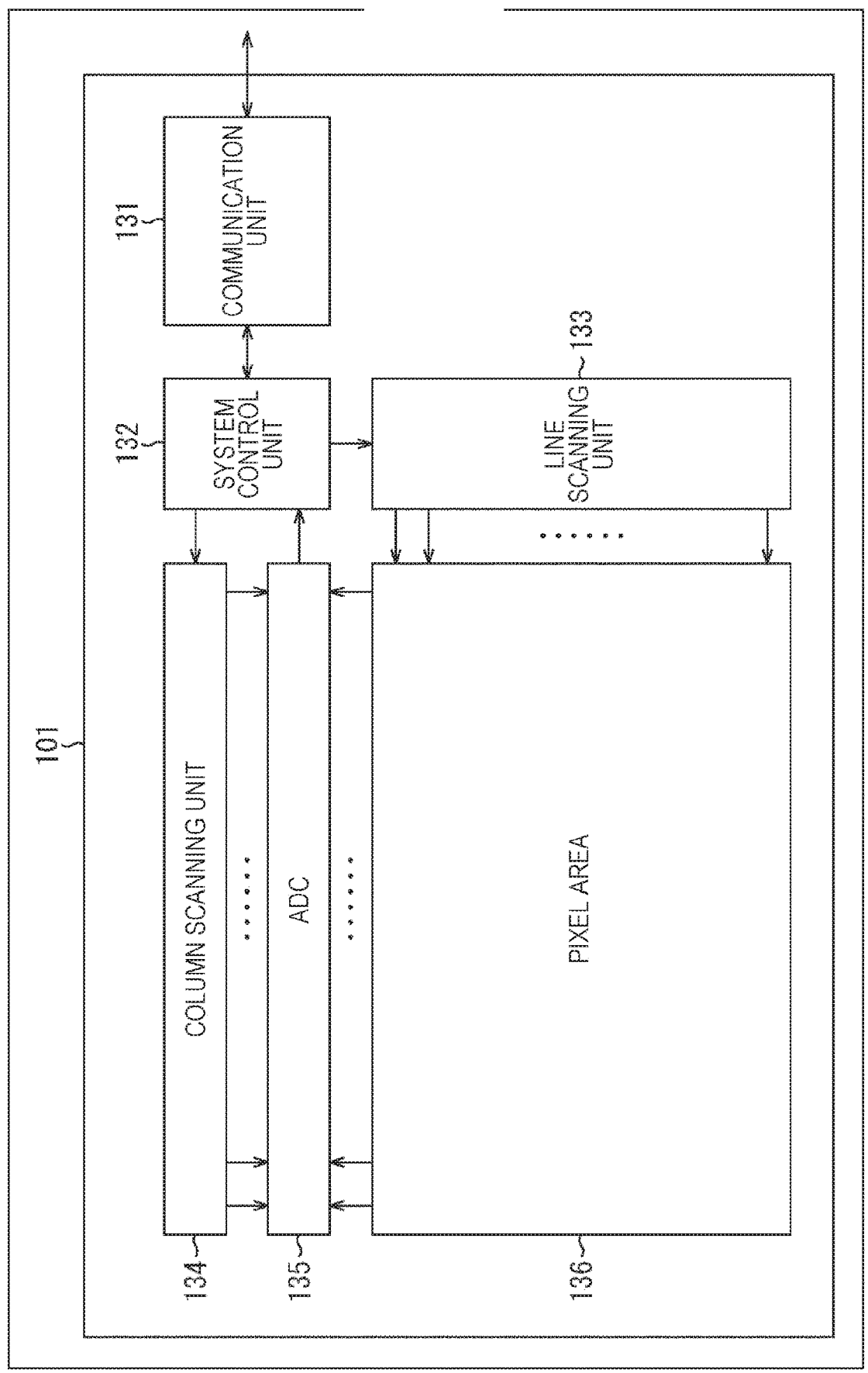
FIG. 3 is a block diagram illustrating a main configuration example of an image sensor.

FIG. 3 is a block diagram illustrating an example of a main configuration of the image sensor 101. Note that while FIG. 3 illustrates main elements such as a processing unit and a flow of data, the elements illustrated in FIG. 3 do not necessarily include all elements. That is, in the image sensor 101, a processing unit not illustrated as a block in FIG. 3 may exist, or a process or data flow not illustrated as an arrow or the like in FIG. 3 may exist.

As illustrated in FIG. 3, the image sensor 101 has a communication unit 131, a system control unit 132, a line scanning unit 133, a column scanning unit 134, an analog digital converter (ADC) 135, and a pixel area 136.

The communication unit 131 performs a process related to communication with the image stabilization unit 102. For example, the communication unit 131 performs communication with the image stabilization unit 102 in accordance with a predetermined communication standard such as Mobile Industry Processor Interface (MIPI). MIPI is an interface standard for cameras and displays of mobile devices, which is formulated by MIPI Alliance.

For example, the communication unit 131 obtains information regarding the readout area (readout area setting instruction) from the image stabilization unit 102 through this communication. The information regarding the readout area (readout area setting instruction) includes, for example, information regarding the position and shape (including size) of the readout area to be set. The communication unit supplies information regarding the readout area (readout area setting instruction) to the system control unit 132.

Furthermore, for example, the communication unit 131 obtains imaged image data (readout image data) supplied from the system control unit 132. This imaged image data (readout image data) is image data obtained in the readout area set by the above information (instruction). The communication unit 131 supplies the imaged image data (readout image data) to the image stabilization unit 102 by the above-described communication. At this time, together with the imaged image data (readout image data), the communication unit 131 supplies the image stabilization unit 102 with information regarding the readout area where the imaged image (readout image) thereof has been obtained. The information regarding the readout area includes, for example, information regarding the position and shape (including size) of the readout area.

The system control unit 132 performs a process related to control of imaging. For example, the system control unit 132 controls the line scanning unit 133 and the column scanning unit 134 to set a readout area in the pixel area 136, and generate an imaged image (that is, a readout image) in the readout area. The system control unit 132 performs such control (that is, setting of the readout area) on the basis of information regarding the readout area (readout area setting instruction) supplied from the image stabilization unit 102 via the communication unit 131. That is, the system control unit 132 sets the readout area at the position and with the shape indicated by the information regarding the readout area.

Furthermore, the system control unit 132 obtains, for example, readout image data obtained in the readout area set in this manner via the ADC 135. The system control unit 132 supplies the readout image data (imaged image data) to the communication unit 131 together with information regarding the readout area from which the readout image data has been obtained, and causes the image stabilization unit 102 to supply them.

The line scanning unit 133 controls driving (scanning) of each line of a pixel array formed in the pixel area 136 according to control of the system control unit 132. That is, the line scanning unit 133 can select a line to be driven from the pixel array. For example, the line scanning unit 133 can drive only each pixel of a line specified as the readout area in the pixel area 136 to generate pixel data.

The column scanning unit 134 controls driving (scanning of columns) of each column of a pixel array formed in the pixel area 136 according to control of the system control unit 132. More specifically, the column scanning unit 134 performs such control by controlling driving of each column ADC in the ADC 135 corresponding to each column of the pixel array. That is, the column scanning unit 134 can select a column from which pixel data is read out in the pixel array. For example, the column scanning unit 134 can read out pixel data only from each pixel of a column specified as the readout area in the pixel area 136.

Therefore, the system control unit 132 can control the line scanning unit 133 and the column scanning unit 134 to set a desired range (line or column) in the pixel array as a readout area, and obtain an imaged image of the readout area (that is, a readout image).

The ADC 135 has an ADC (column ADC) for each column of the pixel array formed in the pixel area 136. The column ADC performs A/D conversion on pixel data of an analog signal read from each pixel in the corresponding column. The ADC 135 is controlled by the column scanning unit 134, drives a column ADC corresponding to a desired column, A/D converts pixel data obtained at each pixel of the column into digital data, and supplies the digital data to the system control unit 132.

That is, by the line scanning unit 133 and the column scanning unit 134 driving the lines and columns of the readout area as described above, the ADC 135 can A/D convert the pixel data of the readout area into readout image data of digital data, and supply the readout image data to the system control unit 132.

The pixel area 136 is an area where a plurality of pixels that photoelectrically converts light from a subject is formed. In the pixel area 136, the plurality of pixels is formed in an array. That is, a pixel array including a plurality of pixels is formed in the pixel area 136. The pixel array is formed over substantially the entire pixel area 136, and can image a subject substantially over the entire pixel area 136. That is, the entire pixel area 136 is an imaging area (effective pixel area) for imaging a subject. In other words, the image sensor 101 can image a subject (obtain an imaged image) using substantially the entire pixel area 136.

Furthermore, as described above, the image sensor 101 can set a partial area of this pixel area 136 as a readout area, and image a subject (obtain an imaged image) in the readout area. That is, the image sensor 101 can also obtain a readout image that is smaller (has a smaller range) than the imaged image of the entire pixel area 136.

Note that an arrangement pattern (layout) of the plurality of pixels in the pixel area 136 is arbitrary, and may be other than an array. However, in the following, a description will be given assuming that the pixel array is formed in the pixel area 136. Note that the number of lines and the number of columns of the pixel array formed in the pixel area 136 are arbitrary. Furthermore, although the shape of the pixel area 136 is illustrated as a rectangle in FIG. 3, the shape of the pixel area 136 is arbitrary and may be other than a rectangle.

<Image Stabilization Unit>

Figure 4:
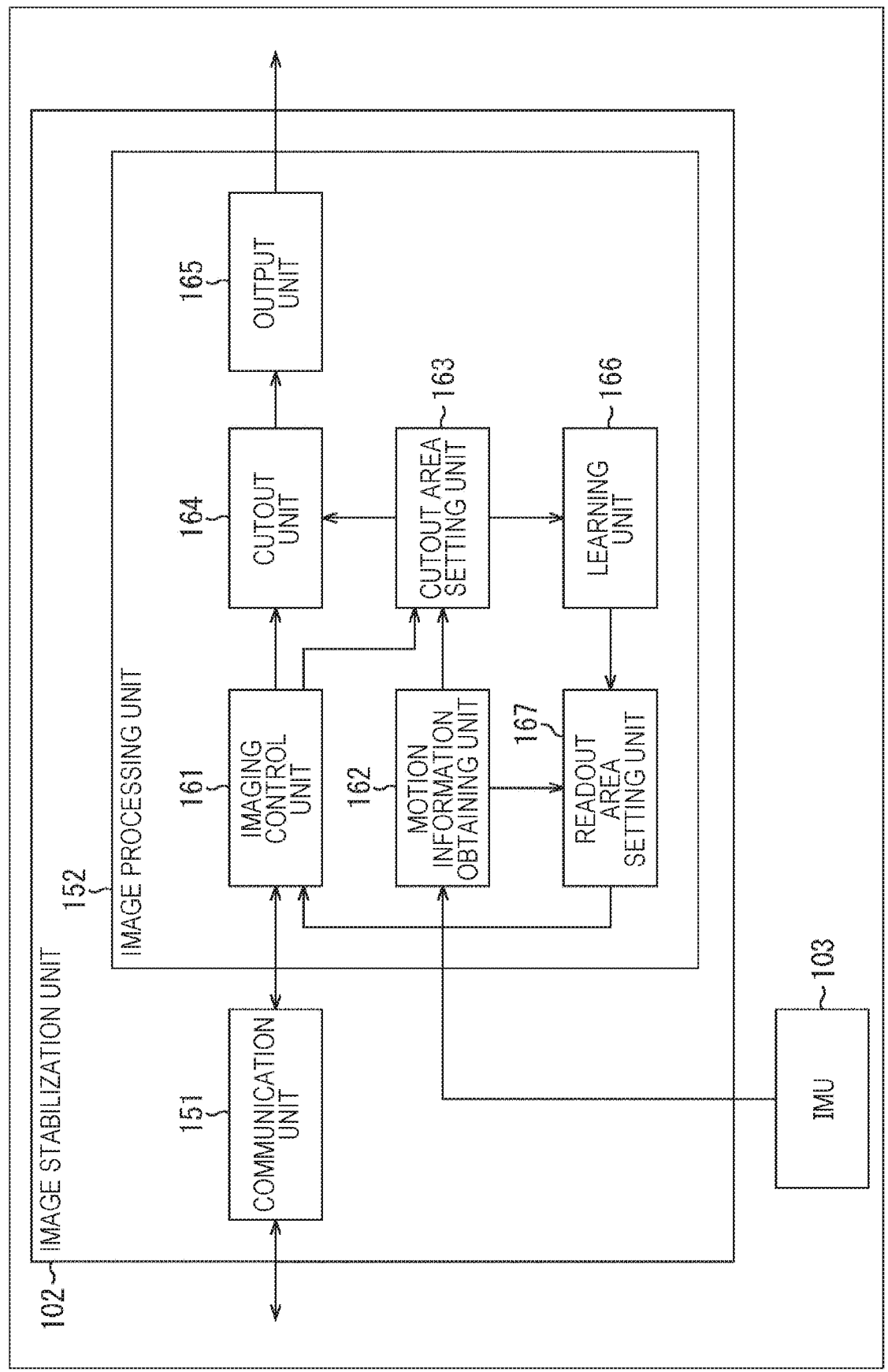
FIG. 4 is a block diagram illustrating a main configuration example of an image stabilization unit.

FIG. 4 is a block diagram illustrating a main configuration example of the image stabilization unit 102. Note that while FIG. 4 illustrates main elements such as a processing unit and a flow of data, the elements illustrated in FIG. 4 do not necessarily include all elements. That is, in the image stabilization unit 102, a processing unit not illustrated as a block in FIG. 4 may exist, or a process or data flow not illustrated as an arrow or the like in FIG. 4 may exist. As illustrated in FIG. 4, the image stabilization unit 102 has a communication unit 151 and an image processing unit 152.

The communication unit 151 performs a process related to communication with the image sensor 101. For example, the communication unit 151 performs communication with the image sensor 101 in accordance with a predetermined communication standard such as MIPI.

For example, the communication unit 151 obtains information regarding the readout area (readout area setting instruction) supplied from the image processing unit 152. The information regarding the readout area (readout area setting instruction) includes, for example, information regarding the position and shape (including size) of the readout area to be set. Through this communication, the communication unit 151 supplies information regarding the readout area (readout area setting instruction) to (the communication unit 131 of) the image sensor 101.

Furthermore, for example, the communication unit 151 obtains imaged image data (readout image data) supplied from the image sensor 101 and information regarding the readout area where the imaged image (readout image) has been obtained, by this communication. The information regarding the readout area includes, for example, information regarding the position and shape (including size) of the readout area. The communication unit 151 supplies the obtained information to the image processing unit 152.

The image processing unit 152 performs a process related to image processing. In particular, the image processing unit 152 performs a process related to image stabilization or the like on the readout image data obtained in the image sensor 101. As illustrated in FIG. 4, the image processing unit 152 has an imaging control unit 161, a motion information obtaining unit 162, a cutout area setting unit 163, a cutout unit 164, an output unit 165, a learning unit 166, and a readout area setting unit 167.

The imaging control unit 161 controls the image sensor 101 via the communication unit 151, and performs a process related to control of imaging. For example, the imaging control unit 161 causes the image sensor 101 to image a subject, and obtains an imaged image (readout image) obtained in a readout area of the pixel area 136 (imaging area).

For example, the imaging control unit 161 supplies information regarding a readout area set by the readout area setting unit 167 to the image sensor 101 as a readout area setting instruction, and causes the image sensor 101 to set a readout area in the pixel area 136 and generate a readout image of the readout area.

The information regarding the readout area (readout area setting instruction) includes, for example, information regarding the position and shape (including size) of the readout area to be set.

Furthermore, for example, the imaging control unit 161 obtains digital data (readout image data) of the generated readout image from the image sensor 101. At that time, the imaging control unit 161 obtains, together with the readout image data, information regarding the readout area where the readout image has been obtained.

This information regarding the readout area includes, for example, information regarding the position and shape (including size) of the readout area to be set.

The imaging control unit 161 supplies the obtained readout image data and the information regarding the readout area to the cutout area setting unit 163 and the cutout unit 164.

The motion information obtaining unit 162 obtains measurement data (IMU data) related to motion and posture of the image sensor 101 measured by the IMU 103. More specifically, the motion information obtaining unit 162 obtains measurement data related to angular velocities and accelerations of the three axes of the image sensor 101. The motion information obtaining unit 162 supplies the IMU data to the cutout area setting unit 163 and the readout area setting unit 167.

The cutout area setting unit 163 performs a process related to setting of a cutout area for cutting out a cutout image. For example, the cutout area setting unit 163 sets the cutout area to cut out a cutout image (partial image) from the readout image supplied from the imaging control unit 161.

This readout image is an imaged image of the current frame (frame to be processed) obtained in the readout area set by the readout area setting unit 167, as described above. That is, the cutout area setting unit 163 sets the cutout area in the readout area of the frame to be processed.

At this time, the cutout area setting unit 163 sets a position and a shape (including size) of the cutout area.

Furthermore, the cutout area setting unit 163 sets a cutout area of a current frame (frame to be processed) on the basis of motion information up to the present corresponding to the measurement data (IMU data) related to motion and posture of the image sensor 101 obtained by the motion information obtaining unit 162. For example, the cutout area setting unit 163 obtains IMU data from the motion information obtaining unit 162. The cutout area setting unit 163 obtains motion information up to the present of the image sensor 101 on the basis of the IMU data obtained by the motion information obtaining unit 162, and sets a cutout area of a current frame (frame to be processed) on the basis of the obtained motion information up to the present.

Furthermore, the cutout area setting unit 163 obtains information regarding the readout area of the current frame (frame to be processed) from the imaging control unit 161. The cutout area setting unit 163 sets a cutout area of the frame to be processed on the basis of the above-described IMU data and the information regarding the readout area of the frame to be processed.

Note that the information regarding the readout area includes information regarding the position and shape of the readout area.

The cutout area setting unit 163 sets the cutout area so that variation in position of the subject is suppressed. That is, the cutout area setting unit 163 sets the cutout area so as to suppress motion of the subject in a cutout image (to stabilize the cutout image).

The cutout area setting unit 163 supplies information regarding the set cutout area to the cutout unit 164 and the learning unit 166. Note that the information regarding the cutout area includes, for example, information regarding the position and shape (including size) of the cutout area.

The cutout unit 164 performs a process related to cutout of a cutout image. For example, the cutout unit 164 obtains, from the imaging control unit 161, readout image data of the current frame and information regarding the readout area. Furthermore, for example, the cutout unit 164 obtains information regarding the cutout area of the current frame from the cutout area setting unit 163. For example, the cutout unit 164 cuts out a cutout image from a readout image of the current frame on the basis of the information. That is, the cutout unit 164 cuts out (extracts), for example, an image in the cutout area set by the cutout area setting unit 163 from the readout image as the cutout image. The cutout unit 164 supplies the cutout image that has been cutout to the output unit 165.

The output unit 165 performs a process related to output of the cutout image. For example, the output unit 165 has an output interface, and outputs data of the cutout image (cutout image data) to the outside of the imaging device 100 (or the image stabilization unit 102) via the output interface. Furthermore, for example, the output unit 165 has an output device such as a monitor or a speaker, and displays the cutout image on a monitor or outputs sound or the like corresponding to the cutout image from the speaker.

The learning unit 166 obtains information regarding the cutout area set by the cutout area setting unit 163. The learning unit 166 performs learning about setting of the readout area by the readout area setting unit 167 on the basis of a setting result of the cutout area up to the present (set position and shape (including size) of the cutout area up to the present). The learning unit 166 supplies an obtained learning result to the readout area setting unit 167, and reflects a learning result thereof on the setting of the readout area.

Note that the learning unit 166 may obtain measurement data and predicted values of motion and posture of the image sensor 101 from the readout area setting unit 167, and may perform, on the basis of them, learning about prediction of motion and posture of the image sensor 101 by the readout area setting unit 167. The learning unit 166 supplies an obtained learning result to the readout area setting unit 167, and reflects a learning result thereof on the prediction of motion and posture of the image sensor 101.

The readout area setting unit 167 performs a process related to the setting of the readout area. For example, the readout area setting unit 167 sets a readout area, which is an area from which an image is read out, in an imaging area formed by a plurality of pixels on the basis of motion prediction information for a predetermined frame after a frame to be processed.

For example, the readout area setting unit 167 sets a position and a shape of the readout area.

For example, the readout area setting unit 167 estimates motion information up to a predetermined frame on the basis of the motion information up to the present as motion prediction information, and sets the readout area on the basis of the estimated motion information.

For example, the readout area setting unit 167 obtains the measurement data (IMU data) related to motion and posture of the image sensor 101 up to the present obtained by the motion information obtaining unit 162 as the current motion information from the motion information obtaining unit 162, estimates motion prediction information on the basis of the IMU data up to the present, and sets the readout area on the basis of the estimated motion prediction information.

Further, the readout area setting unit 167 can set the readout area, for example, by reflecting the learning result of the learning unit 166. Furthermore, for example, the readout area setting unit 167 can also predict motion and posture of the image sensor 101 by reflecting the learning result of the learning unit 166.

The readout area setting unit 167 supplies information regarding the set readout area to the imaging control unit 161. The information regarding the readout area includes information regarding the position and shape of the readout area.

<Overview of Image Stabilization>

Next, an outline of a flow of processing related to stabilization of image will be described. The setting of the readout area is only required to be performed before reading out the frame to be processed (frame i (Frame i)) on which the image sensor 101 is performing a process. The setting of the cutout area is only required to be performed before the cutout is performed.

For example, the image stabilization unit 102 may set a readout area for a frame after a frame to be processed (frame i (Frame i)) on which the image sensor 101 is performing a process, and set a cutout area for the frame to be processed.

Figure 5:
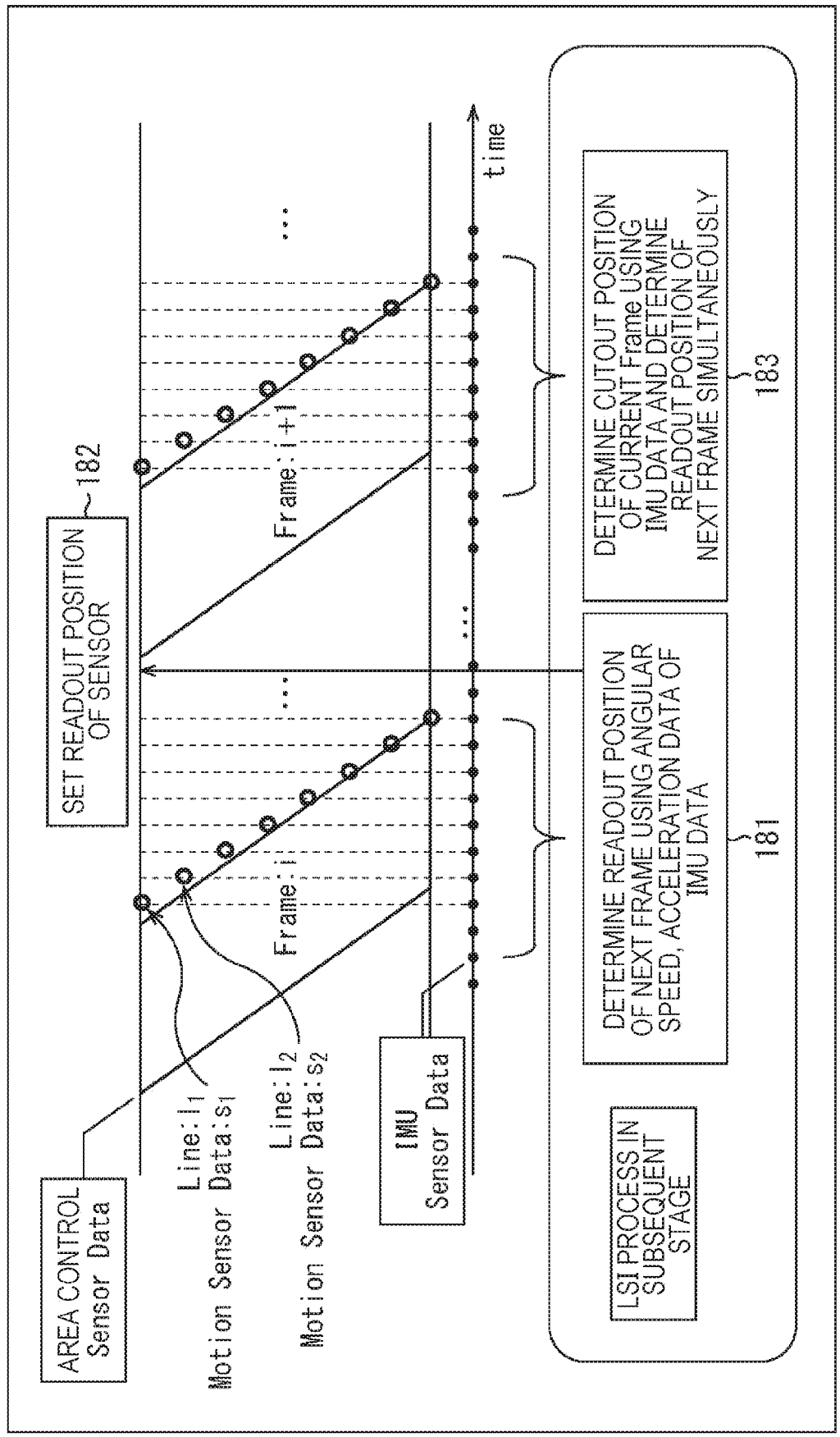
FIG. 5 is a diagram describing an overview of an image stabilization process to which the present technology is applied.

For example, as in an example illustrated in FIG. 5, the readout area setting unit 167 may set the readout area of a frame (frame i+1 (Frame i+1)) next to the frame to be processed (frame i (Frame i)), and the cutout area setting unit 163 may set the cutout area of the frame to be processed (frame i (Frame i)).

In the case of the example of FIG. 5, the image stabilization unit 102 performs a process 181 while the image sensor 101 is performing a process on the frame to be processed (frame i (Frame i)). That is, the readout area setting unit 167 determines a readout position (readout area) of the next frame using angular velocity and acceleration data of the IMU data.

When the readout position is determined, the image stabilization unit 102 performs a process 182. That is, the imaging control unit 161 supplies the image sensor 101 with information regarding the readout area of the frame next to the frame to be processed (frame i+1 (Frame i+1)), and sets a readout position of the image sensor 101.

Then, when the frame to be processed by the image sensor 101 becomes the frame i+1 (Frame i+1), the image stabilization unit 102 performs a process 183. That is, the cutout area setting unit 163 determines a cutout position of the frame to be processed (frame i+1 (Frame i+1)) using the IMU data. Furthermore, the readout area setting unit 167 determines a readout position of the next frame (frame i+2 (Frame i+2) of the frame to be processed.

Figure 6:
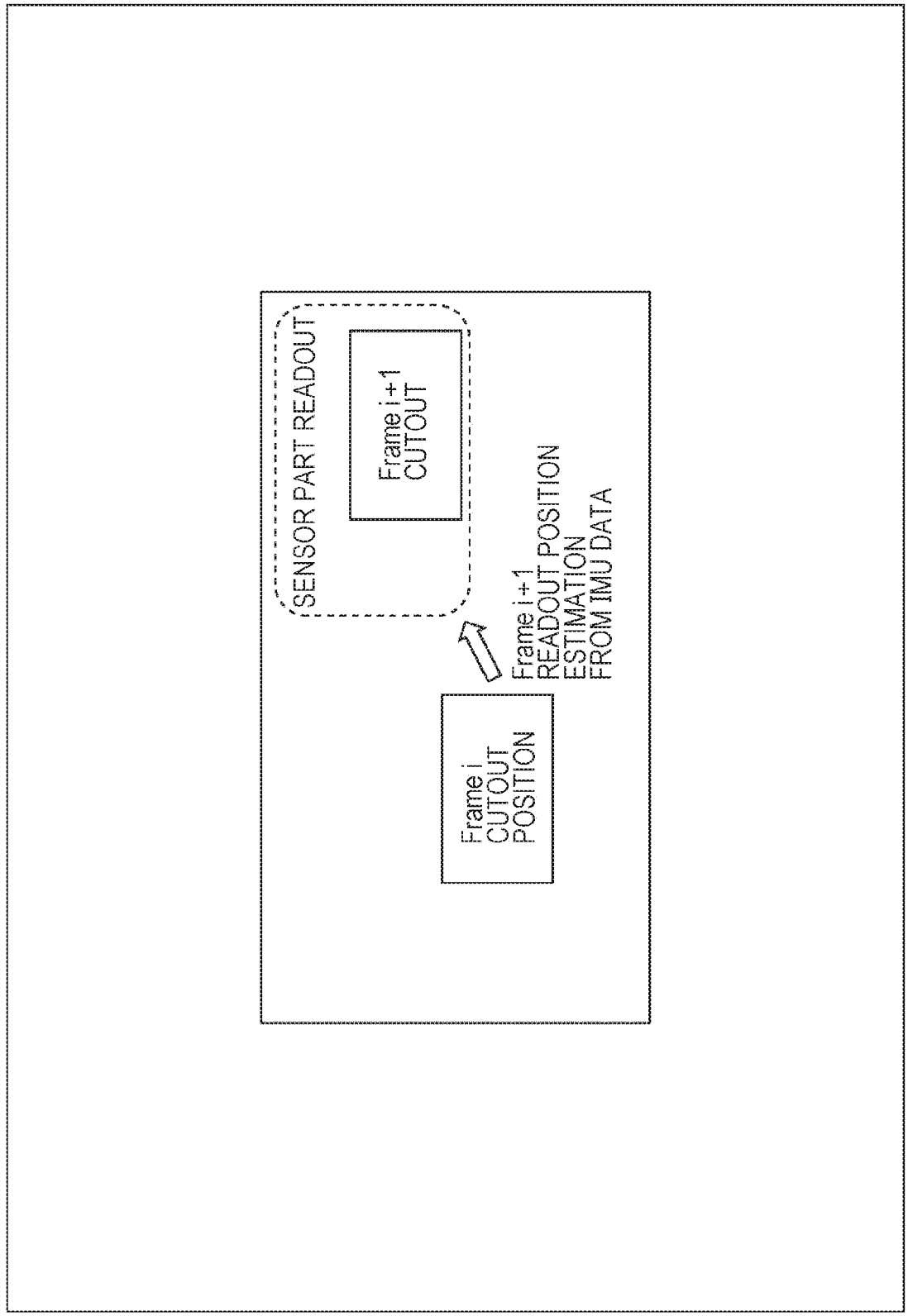
FIG. 6 is a diagram describing an example of how a readout area is set.

That is, as illustrated in FIG. 6, by setting a future readout area and a current cutout area for each frame, an imaged image obtained in a part of the pixel area 136 as a readout image can be read out from the image sensor 101, and a cutout image can be generated using the readout image. That is, stabilization of the image can be performed.

Therefore, as described above, an increase in load due to image stabilization can be suppressed.

<Setting Readout Area>

As described above, the readout area setting unit 167 sets a readout area for a predetermined frame after the frame to be processed, that is, a future frame. At that time, the readout area setting unit 167 predicts (estimates) motion of the image sensor 101 (motion of a subject in the imaged image) up to the predetermined frame on the basis of the IMU data, and set the readout area on the basis of the motion prediction information.

This method of setting the readout area on the basis of the motion prediction information is arbitrary. For example, the readout area setting unit 167 may move the readout area of the frame to be processed (current frame) according to the motion prediction information.

The method of predicting motion of the image sensor 101 is arbitrary. For example, the readout area setting unit 167 may predict future IMU data on the basis of a change in value of the IMU data up to the present. For example, in the case of an example of FIG. 7, the readout area setting unit 167 may predict IMU data 209 to IMU data 212 of a next frame (Frame i+1) on the basis of IMU data 201 to IMU data 208 obtained in the frame to be processed (Frame i). For example, in the case of FIG. 7, the readout area setting unit 167 estimates that the IMU data changes along a straight line 221 on the basis of a change between the IMU data 207 and the IMU data 208, or the like, so as to predict the IMU data 209 to the IMU data 212 along the straight line 221.

For example, the readout area setting unit 167 moves the readout area on the basis of the IMU data 209 to the IMU data 212 predicted (estimated) as described above. In this manner, the readout area setting unit 167 can set the readout area of a frame thereafter on the basis of the IMU data up to the present.

Note that at this time, the readout area setting unit 167 may change the shape and the size of the readout area on the basis of arbitrary information. For example, the shape and the size of the readout area may be changed according to a predicted magnitude of motion (magnitude of angular velocity or acceleration) or the like.

Furthermore, for example, the readout area setting unit 167 may estimate a cutout area (position and shape) in a predetermined frame on the basis of the motion prediction information (estimated value of IMU data up to a predetermined frame), and may set (estimate) the readout area on the basis of the estimated cutout area (so as to include the estimated cutout area).

In this manner, more various settings of the readout area can be achieved. For example, the manner of setting a margin of the readout area with respect to the cutout area can be made variable according to estimated motion. As illustrated in FIG. 6, the readout area is larger than the cutout area. Therefore, the set readout area includes a portion other than the estimated cutout area. This portion can be used as a margin for estimation error of the cutout area.

Figure 7:
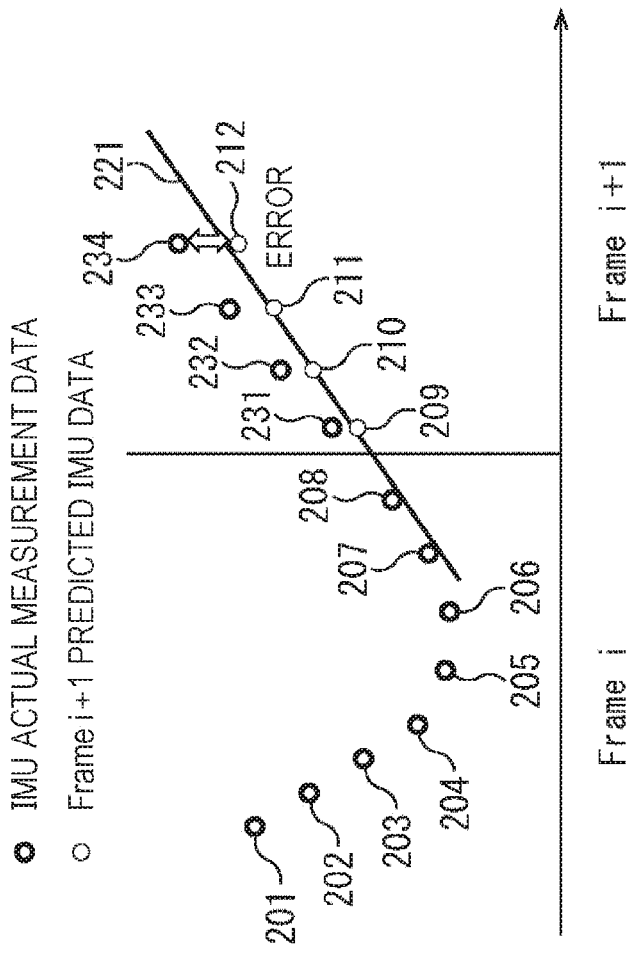
FIG. 7 is a diagram describing an example of estimation of IMU data.

For example, as illustrated in FIG. 7, assuming that IMU data 231 to IMU data 234 have been obtained in a frame i+1 (Frame i+1), a difference between these data and the predicted IMU data 209 to IMU data 212 is an error of estimation of the cutout area. If this error is too large, a cutout area cannot be set in the readout area, and there is a possibility that accuracy of image stabilization decreases. That is, it can be said that the larger the gap between the frame of the estimated cutout area and the frame of the set readout area, the larger the margin.

The readout area may be set so as to include the estimated cutout area, and it is arbitrary in which direction and how much margin is included. That is, the readout area setting unit 167 may be capable of setting at what position the readout area is to be set with respect to the estimated cutout area on the basis of the motion prediction information.

For example, assuming that there is a high possibility that the position of the estimated cutout area includes an error in a motion direction, the readout area setting unit 167 may set the readout area so as to have more margin in the motion direction.

Furthermore, for example, conversely assuming that there is a high possibility that the position of the estimated cutout area includes an error in a direction perpendicular to the motion direction, the readout area setting unit 167 may set the readout area so as to have more margin in the motion direction.

In this manner, the imaging device 100 can generate a readout image so as to include a cutout image with higher accuracy. Therefore, performance of image stabilization of the imaging device 100 can be improved.

Note that when the motion prediction as illustrated in FIG. 7 is performed, the readout area setting unit 167 may perform motion prediction of the image sensor 101 on the basis of information other than the IMU data up to the present. For example, in a case of hand shake, a subject in an imaged image generally moves like periodic vibrations, and is less likely to move in only one direction, such as from right to left. Similarly, in a case of a wearable device to be worn on the human body, a subject in an imaged image generally moves like periodic vibrations due to walking motion or the like, such as from right to left, and it is unlikely to move in only one direction.

Therefore, the readout area setting unit 167 may estimate motion information up to a predetermined frame next to the frame to be processed and thereafter, according to a predetermined regularity, on the basis of the motion information up to the present. For example, the readout area setting unit 167 may perform the motion prediction in consideration of not only the IMU data up to the present, but also motion such as motion of hand shake or motion of walking.

In this manner, it is possible to perform motion prediction more suitable for hand shake correction or shake correction (image stabilization) in a wearable device, and it is possible to improve prediction accuracy. Therefore, the imaging device 100 can generate a readout image so as to include a cutout image with higher accuracy. Therefore, performance of image stabilization of the imaging device 100 can be improved.

Note that, in a case where a cutout area cannot be set within a set readout area, the cutout area setting unit 163 may set the cutout area at a position closest in the motion direction to the position of the cutout area corresponding to the motion information up to the present in the readout area of the frame to be processed.

That is, when the cutout area is set, the cutout area may be forcibly set in the readout area. As described above, in a case where a readout image is read from the image sensor 101 and a cutout image is generated by cutting out the readout image, the cutout image cannot be generated unless the cutout area can be set in the readout area. Accordingly, the cutout area setting unit 163 always sets the cutout area in the readout area. In this manner, the cutout image can be reliably generated.

Furthermore, at this time, the cutout area setting unit 163 may set the cutout area to a position (closest position) closest to the position of the cutout area that is obtained from the motion information up to the present in the readout area. That is, the cutout area may be set at a position closest in the motion direction to the position of the cutout area corresponding to the motion information up to the present in the readout area of the frame to be processed. In this manner, it is possible to suppress an increase in shake of the position of the subject in the cutout image.

Furthermore, when setting a readout area of a predetermined frame thereafter, the readout area setting unit 167 may change the shape and the size of the readout area.

Figure 8:
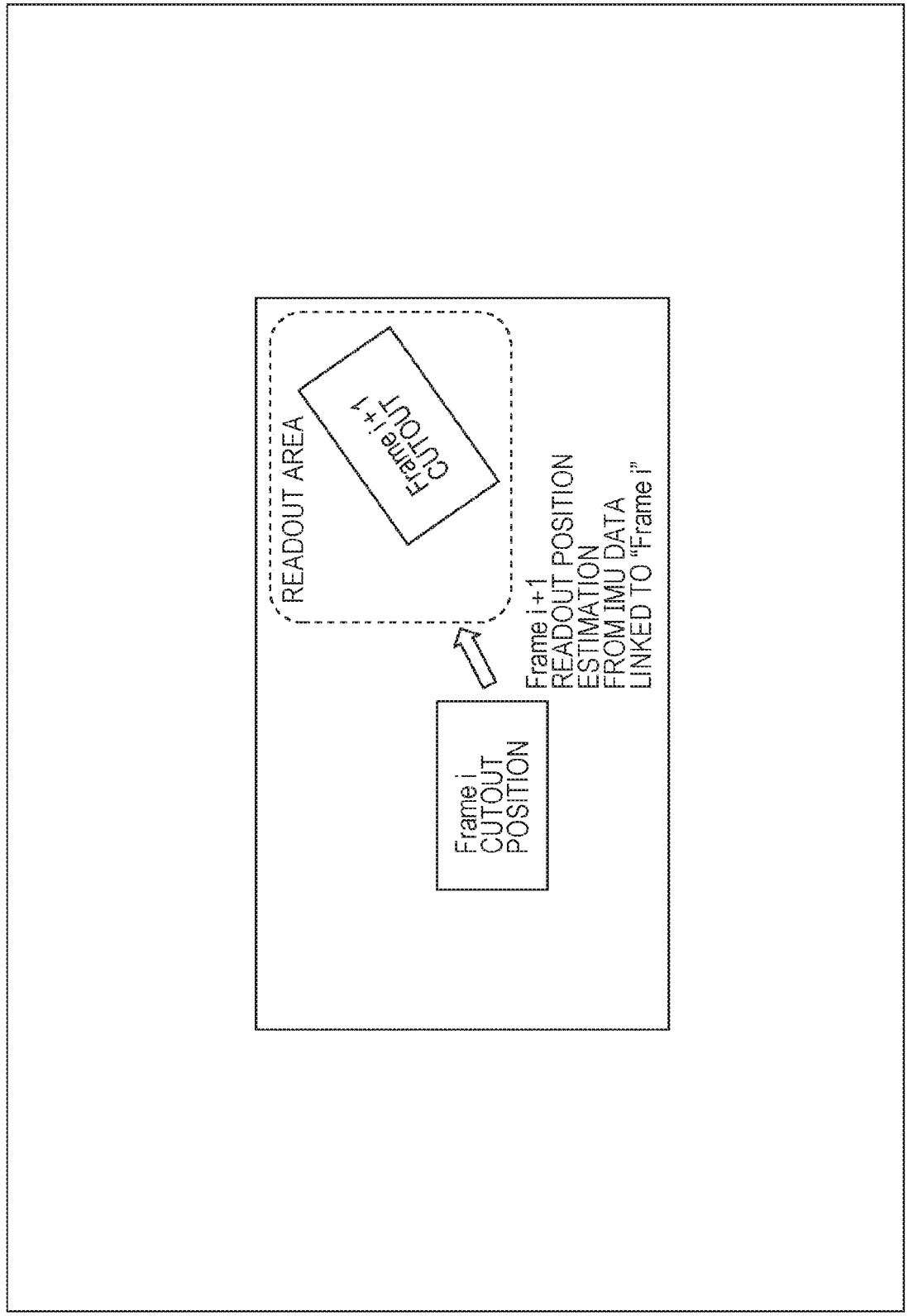
FIG. 8 is a diagram describing an example of how the readout area is set.

For example, the readout area setting unit 167 may set the shape and the size of the readout area according to a rotation amount of an estimated cutout area. For example, as illustrated in FIG. 8, when the estimated cutout area rotates, the shape and the size of the readout area including the cutout area change (differ depending on the amount of rotation of the cutout area). Accordingly, when the cutout area estimated in this manner rotates, the shape and the size of the readout area may be set according to the amount of rotation. In this manner, the readout area can include a cutout area with higher accuracy. Therefore, performance of image stabilization of the imaging device 100 can be improved.

Figure 9:
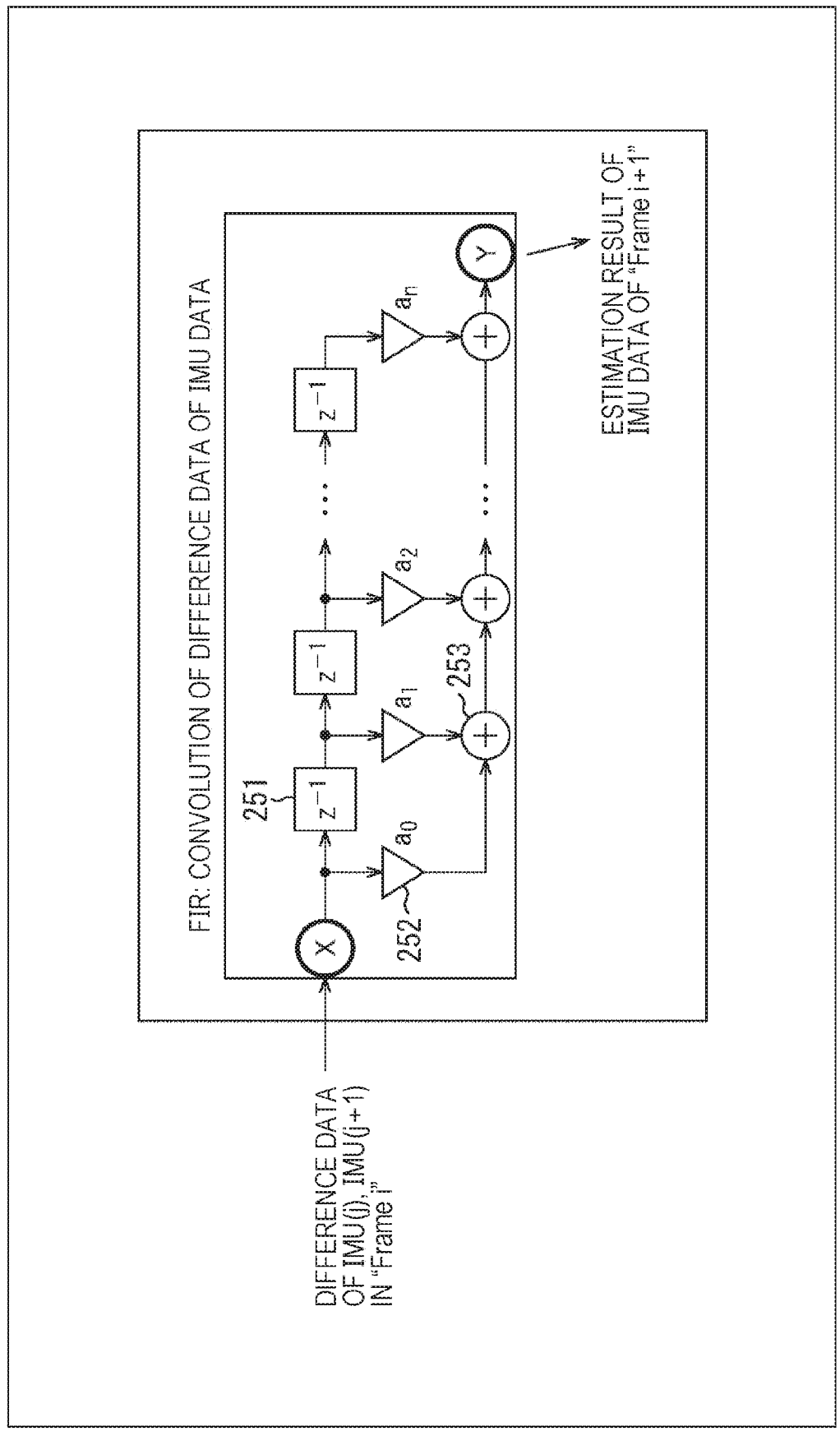
FIG. 9 is a diagram describing an example of estimation of the IMU data.

Note that the IMU data used for motion prediction may be any IMU data up to the present, and not only the IMU data of the current frame but also the IMU data of a past frame may be used. The number of pieces of the IMU data used for motion prediction is arbitrary, and IMU data of an arbitrary number of frames may be used. The IMU data of a predetermined frame may be estimated by using, for example, a finite impulse response (FIR) filter including a delay element 251, an amplification unit 252, and an addition unit 253 as illustrated in FIG. 9, and convolving difference data of IMU data of a plurality of frames.

Figure 10:
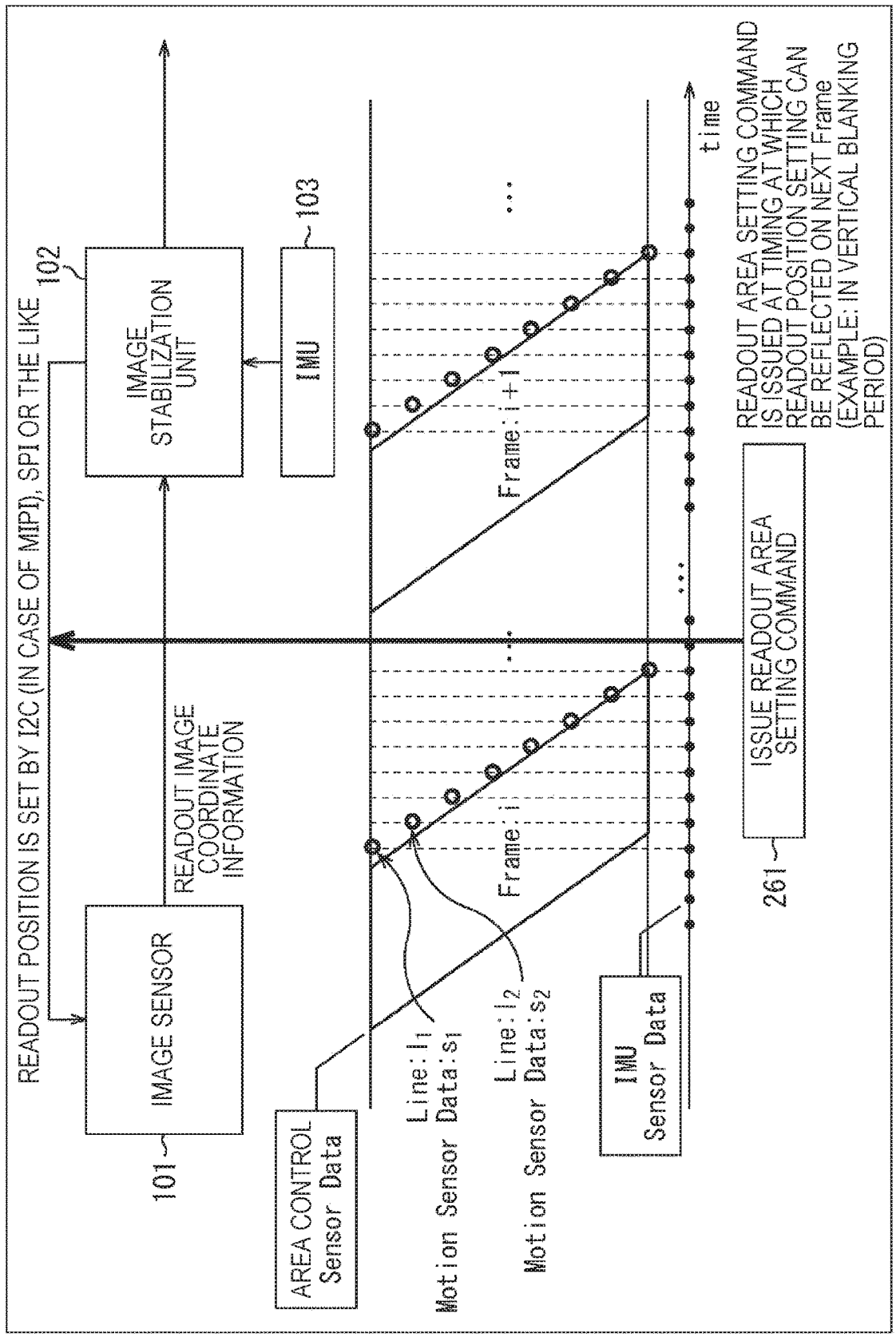
FIG. 10 is a diagram describing an example of a state of setting the readout area.

When the readout area setting unit 167 sets the readout area, the imaging control unit 161 issues a readout area setting command to the image sensor 101 at a timing at which readout position setting can be reflected on a frame next to the frame to be processed, for example, as illustrated in FIG. 10 (process 261). For example, the imaging control unit 161 issues the readout area setting command during a vertical blanking period. The readout area setting command includes information regarding a readout area of the frame next to the frame to be processed (frame i+1 (Frame i+1)). The information regarding the readout area includes information regarding the position and shape of the readout area.

For example, the imaging control unit 161 sets a readout position in the image sensor 101 via the communication unit 151 using I2C (in a case of MIPI), SPI, or the like.

<Flow of Imaging Process>

Next, processes executed in the above-described imaging device 100 will be described. First, an example of a flow of an imaging process will be described with reference to the flowchart in FIG. 11.

When the imaging process is started, the imaging control unit 161 initializes settings in step S101. For example, the imaging control unit 161 initializes the setting of the readout area (for example, the position, shape, and the like of the readout area), and the like.

In step S102, the imaging control unit 161 controls the image sensor 101 to image a subject. The image sensor 101 images the subject and generates a readout image of the set readout area.

In step S103, the imaging control unit 161 obtains an imaged image (readout image) of the readout area obtained by imaging of the process in step S102 and coordinate information thereof (information regarding the readout area).

In step S104, the motion information obtaining unit 162 obtains the IMU data corresponding to the current frame from the IMU 103.

In step S105, the cutout area setting unit 163 sets a cutout area of the current frame so that variation (shake) in position of the subject is suppressed on the basis of the readout image obtained in step S103 and the coordinate information thereof, as well as the IMU data corresponding to the current frame obtained in step S104.

In step S106, the cutout unit 164 cuts out an image of the cutout area set by the process in step S105 from the readout image obtained in step S103, and generates a cutout image.

In step S107, the output unit 165 outputs the cutout image generated by the process in step S106.

In step S108, the learning unit 166 performs learning of the readout position estimation on the basis of a cutout result in step S106.

In step S109, the readout area setting unit 167 sets a readout area of a predetermined frame thereafter (for example, a next frame) by reflecting a learning result in step S108.

When the readout area is set, in step S110, the imaging control unit 161 determines whether or not to end the imaging. If it is determined not to end, the imaging control unit 161 supplies information regarding the readout area set in step S109 to the image sensor 101, and causes the image sensor 101 to set the readout area. That is, the setting of the readout area is updated. When the setting of the readout area is updated, the imaging control unit 161 returns the process to step S102, and repeats the subsequent processes.

Furthermore, if it is determined to end the imaging in step S110, the imaging process ends.

<Flow of Readout Area Setting Process>

Next, an example of a flow of a readout area setting process executed in step S109 in FIG. 11 will be described with reference to a flowchart in FIG. 12.

When the readout area setting process is started, in step S131 the readout area setting unit 167 estimates IMU data corresponding to a predetermined frame after the current frame (for example, a next frame) on the basis of the IMU data or the like corresponding to the current frame.

In step S132, the readout area setting unit 167 estimates (a position and a shape (including size) and the like of) a readout area in the predetermined frame after the current frame (for example, the next frame) on the basis of an estimation result or the like of the IMU data corresponding to the predetermined frame after the current frame (for example, the next frame).

Figure 11:
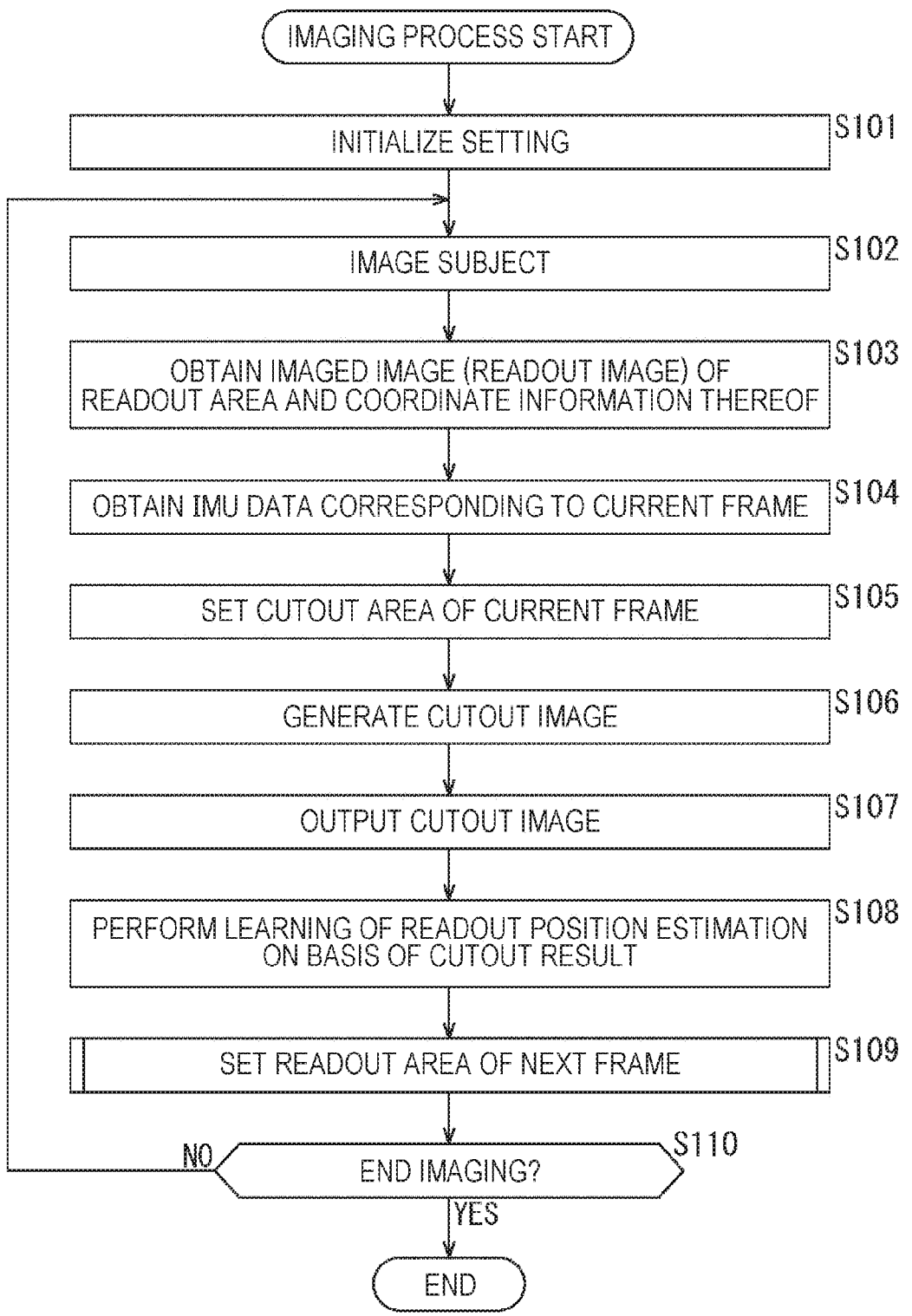
FIG. 11 is a flowchart describing an example of a flow of an imaging process.
Figure 12:
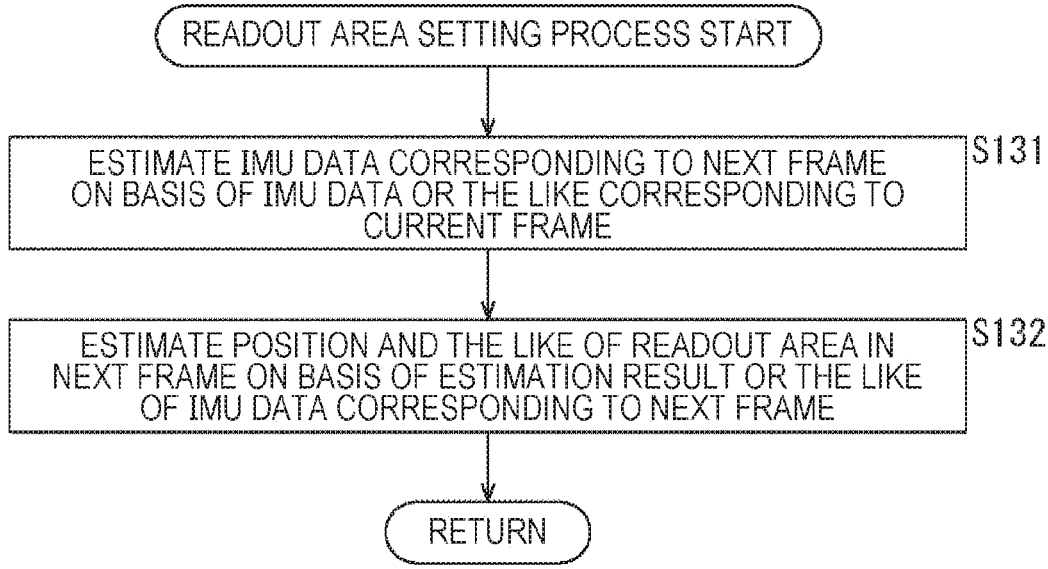
FIG. 12 is a flowchart describing an example of a flow of a readout area setting process.

When the process in step S132 ends, the readout area setting process ends, and the process returns to FIG. 11.

<Flow of Readout Area Setting Process>

Next, another example of a flow of the readout area setting process executed in step S109 in FIG. 11 will be described with reference to a flowchart in FIG. 13.

Figure 13:
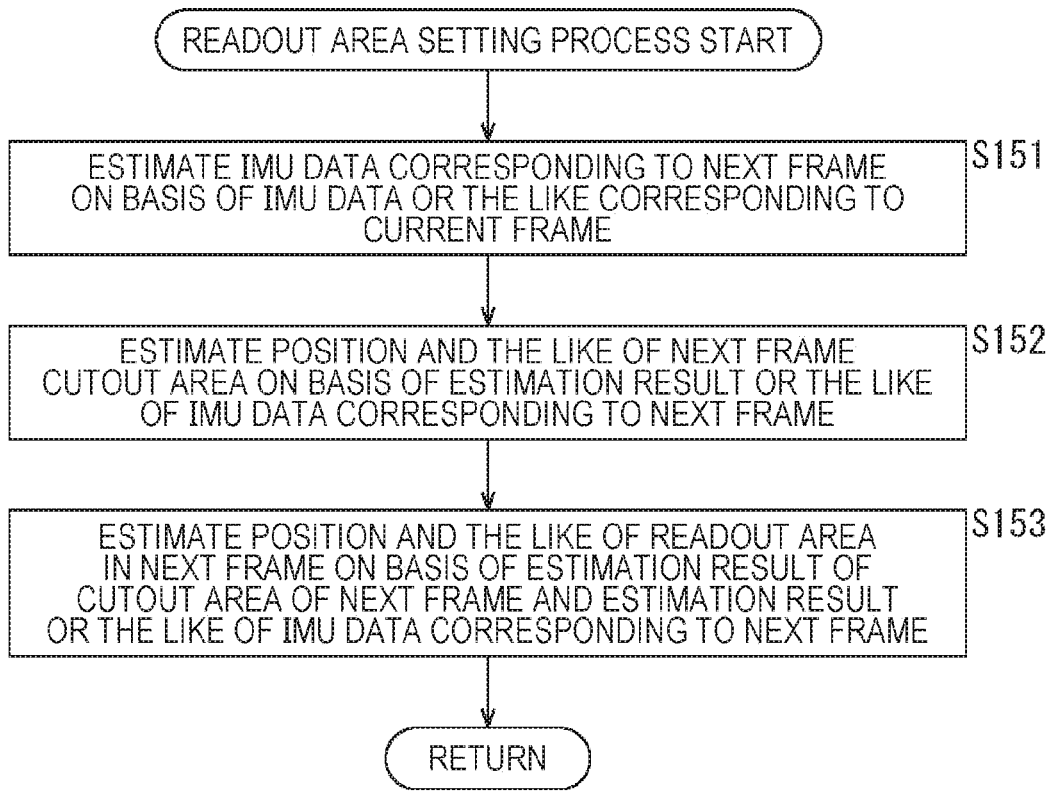
FIG. 13 is a flowchart describing an example of a flow of the readout area setting process.

In the case of FIG. 13, when the readout area setting process is started, the readout area setting unit 167 estimates IMU data corresponding to a predetermined frame after the current frame (for example, a next frame) in step S151 on the basis of the IMU data or the like corresponding to the current frame.

In step S152, the readout area setting unit 167 estimates (a position and a shape (including size) and the like) of a cutout area in the predetermined frame after the current frame (for example, the next frame) on the basis of an estimation result or the like of the IMU data corresponding to the predetermined frame after the current frame (for example, the next frame).

In step S153, the readout area setting unit 167 estimates (a position and a shape (including size) and the like) of a readout area in the predetermined frame after the current frame (for example, the next frame) on the basis of an estimation result of the cutout area of the predetermined frame after the current frame (for example, the next frame) and an estimation result or the like of the IMU data corresponding to the predetermined frame after the current frame (for example, the next frame).

When the process in step S153 ends, the readout area setting process ends, and the process returns to FIG. 11.

By executing each process as described above, the readout image 122 obtained in the readout area that is a part of the pixel area 121 is read from the image sensor 101 as an imaged image, and it is possible to cut out a cutout image in which the image is stabilized (in which motion of a subject is suppressed) from the readout image. That is, an increase in the amount of data read from the image sensor 101 can be suppressed, and an increase in load due to image stabilization can be suppressed.

<Others>

Note that in the foregoing, it has been described that the image stabilization is performed as described above when an imaged image is obtained, but without being limited thereto, the image stabilization may be performed as described above for example when a captured image for displaying on a monitor or the like before imaging is obtained. In the case of the captured image, the processes performed by the image sensor 101 and the image stabilization unit 102 are similar to those in the case of the above-described imaged image, and a description thereof will be omitted.

Furthermore, in FIG. 3, the ADC 135 is described as having a column ADC, but the ADC which the ADC 135 has is arbitrary and is not limited to this example. For example, the ADC 135 may have an ADC for each line (line ADC), may have an ADC for each area (area ADC), or may have an ADC for each pixel (pixel ADC). However, in those cases, the configurations of the scanning units (the line scanning unit 133 and the column scanning unit 134) may be different from those of the above-described example.

For example, in a case where the ADC 135 has the line ADC, the column scanning unit 134 selects a pixel column to be driven, and the line scanning unit 133 controls the ADC 135 to select a pixel line for which the line ADC is driven. Further, for example, in a case where the ADC 135 has the area ADC, a scanning unit that controls driving of the pixel array is provided for each area thereof instead of the line scanning unit 133 and the column scanning unit 134. Furthermore, for example, in a case where the ADC 135 has the pixel ADC, a scanning unit that controls driving of the pixel array for each pixel is provided instead of the line scanning unit 133 and the column scanning unit 134.

Further, it has been described above that the learning unit 166 performs learning for every frame in the above description, but the learning by the learning unit 166 may be performed for a part of the frames. Furthermore, for example, the learning by the learning unit 166 may be performed collectively in a part of the frames. Moreover, for example, the learning by the learning unit 166 may be performed irregularly. Moreover, (the learning by) the learning unit 166 may be omitted.

3. Second Embodiment

<Motion Vector>

In the first embodiment, it has been described that the IMU data is used as the motion information, but the motion information is not limited to this example. For example, a motion vector between frames of an imaged image may be used as motion information for setting a readout area or a cutout area.

Figure 14:
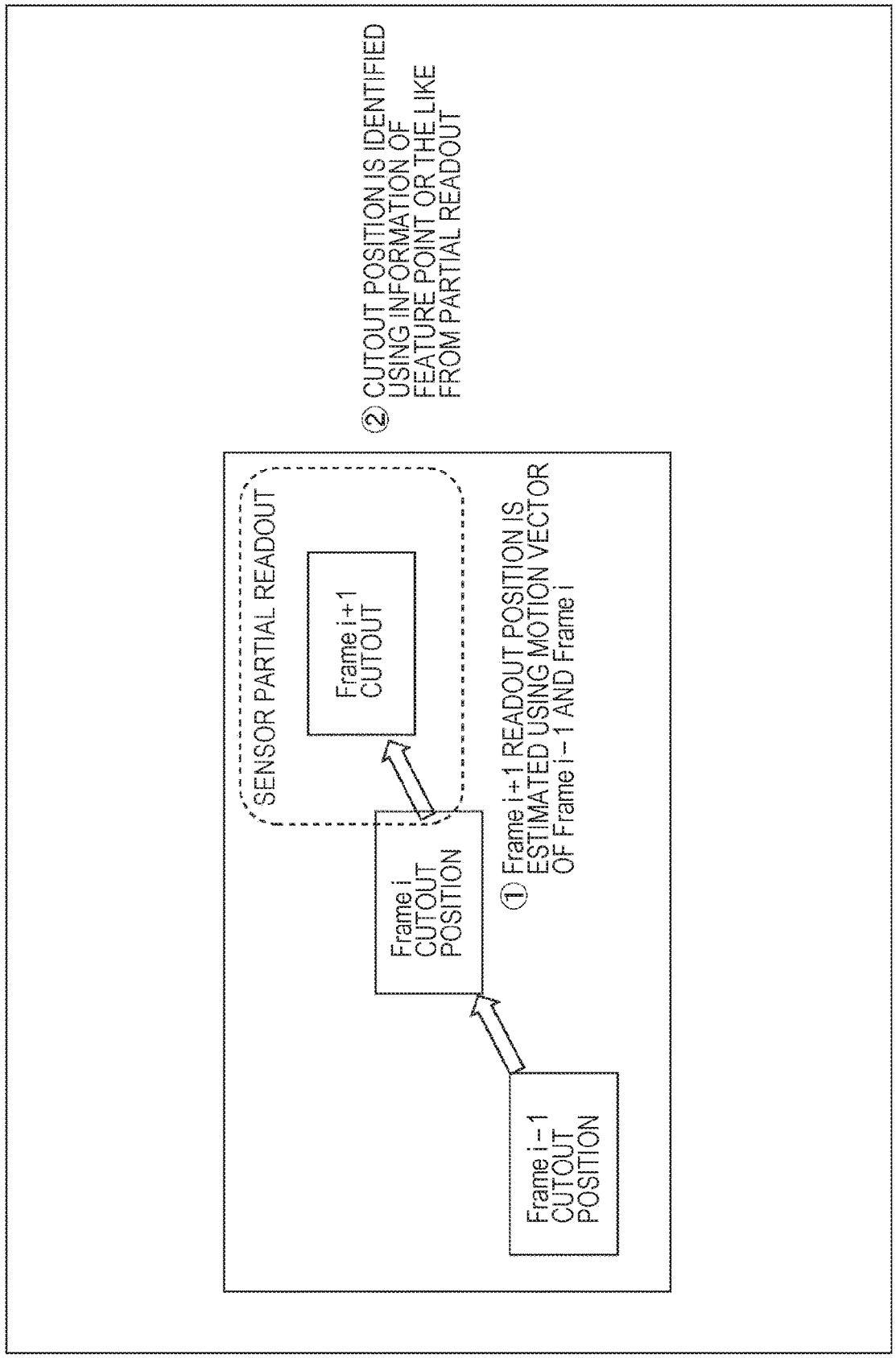
FIG. 14 is a diagram describing an example of how a readout area is set.

For example, as illustrated in FIG. 14, a motion vector may be obtained using a feature point between a frame i−1 (Frame i−1) and a frame i (Frame i), a motion vector between the frame i (Frame i) and a frame i+1 (Frame i+1) may be estimated using this motion vector, and a readout position of the frame i+1 (Frame i+1) may be estimated using this estimated motion vector. Then, a cutout area may be set from a readout image using information on the feature points.

In this case, the IMU 103 can be omitted. That is, in this case, the imaging device 100 includes the image sensor 101 and the image stabilization unit 102. Therefore, an increase in cost can be suppressed.

<Image Stabilization Unit>

Figure 15:
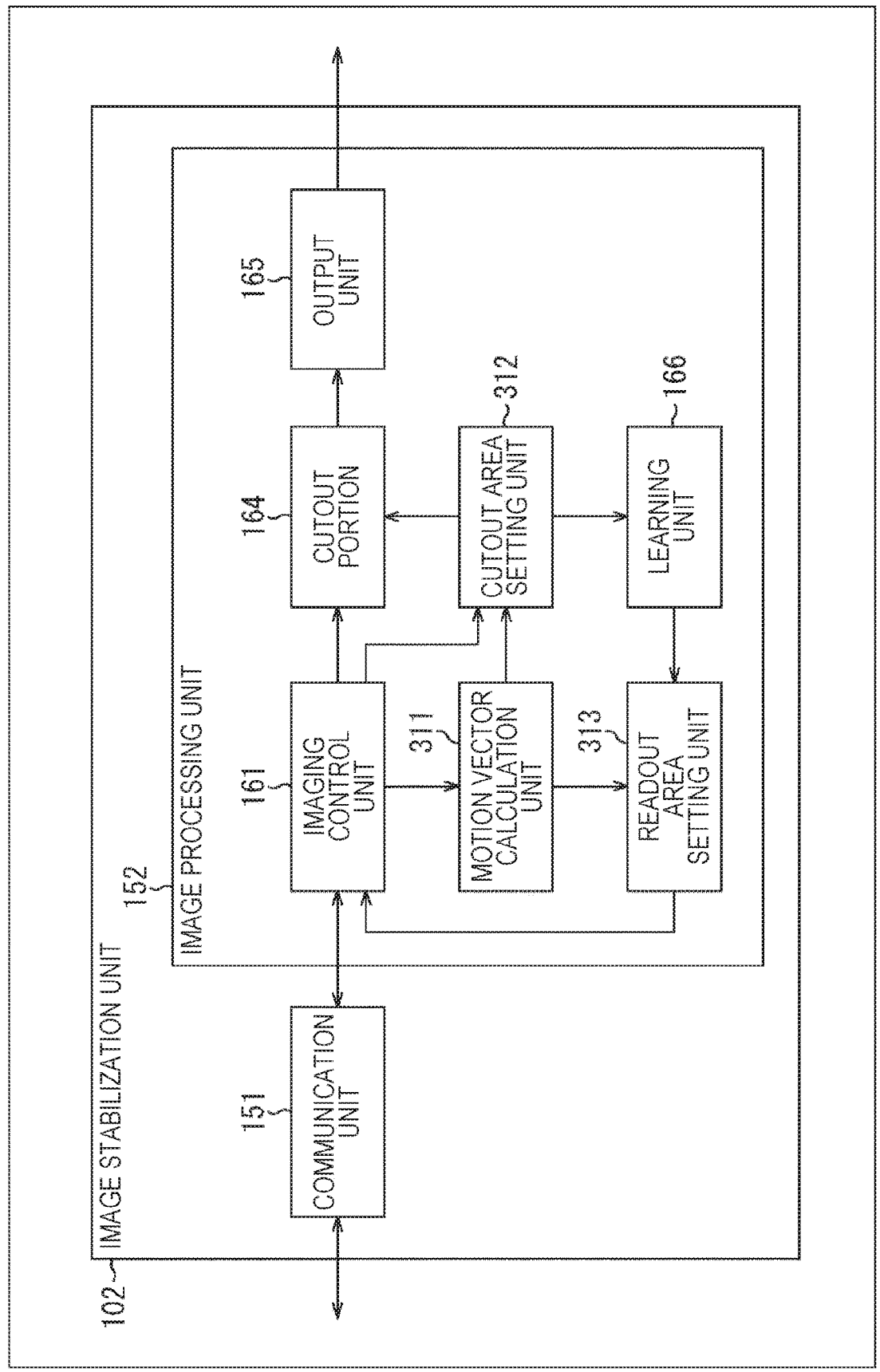
FIG. 15 is a block diagram illustrating a main configuration example of an image stabilization unit.

FIG. 15 illustrates a main configuration example of an image stabilization unit 102 in this case. As illustrated in FIG. 15, the image stabilization unit 102 in this case has a motion vector calculation unit 311 instead of the motion information obtaining unit 162 (FIG. 4). Furthermore, the image stabilization unit 102 in this case (FIG. 15) has a cutout area setting unit 312 instead of the cutout area setting unit 163 (FIG. 4). Moreover, the image stabilization unit 102 in this case (FIG. 15) has a readout area setting unit 313 instead of the readout area setting unit 167 (FIG. 4).

The motion vector calculation unit 311 obtains from an imaging control unit 161 a readout image obtained by the imaging control unit 161 from the image sensor 101 and information regarding the readout area. The imaging control unit 161 calculates (detects) a motion vector between frames for a feature point of the readout image (imaged image). The motion vector calculation unit 311 supplies the calculated motion vector to the cutout area setting unit 312 and the readout area setting unit 313.

The cutout area setting unit 312 sets a cutout area of the frame to be processed (current frame) on the basis of the motion vector up to the present calculated (detected) by the motion vector calculation unit 311. Other processes are similar to those in the case of the cutout area setting unit 163 described in the first embodiment.

The readout area setting unit 313 sets a readout area of a predetermined frame after the frame to be processed (current frame) on the basis of the motion vector up to the present calculated (detected) by the motion vector calculation unit 311. Processes thereafter are similar to those in the case of the readout area setting unit 167 described in the first embodiment.

In this manner, it is possible to set a readout area and a cutout area using a motion vector between frames of feature points of the imaged image. Therefore, since the IMU 103 can be omitted, an increase in cost can be suppressed.

<Flow of Imaging Process>

An example of a flow of the imaging process in this case will be described with reference to a flowchart in FIG. 16. When the imaging process is started, respective processes in steps S201 to S203 are executed similarly to the respective processes in steps S101 to S103 of the imaging process in FIG. 11.

In step S204, the motion vector calculation unit 311 calculates a motion vector corresponding to the current frame by using a readout image obtained in step S103. That is, the motion vector calculation unit 311 compares feature points of the readout image between the current frame and a frame immediately before the current frame, and calculates a motion vector.

In step S205, the cutout area setting unit 312 sets the cutout area of the current frame on the basis of the motion vector obtained by the process in step S204 so as to suppress variation (shake) in the position of the subject.

Respective processes in steps S206 to S208 are executed similarly to the respective processes in steps S106 to S108 of the imaging process in FIG. 11.

In step S209, the readout area setting unit 313 sets a readout area of a predetermined frame thereafter (for example, a next frame) by reflecting a learning result in step S208.

A process in step S210 is executed similarly to the process in step S110 of the imaging process in FIG. 11. That is, if it is determined not to end the imaging process in step S210, information regarding the readout area set in S209 is supplied to the image sensor 101, so as to cause the image sensor 101 to set the readout area. That is, setting of the readout area is updated. When the setting of the readout area is updated, the imaging control unit 161 returns the process to step S202, and repeats the subsequent processes. Furthermore, if it is determined to end the imaging in step S110, the imaging process ends.

<Flow of Readout Area Setting Process>

Next, an example of a flow of a readout area setting process (readout area setting process executed in step S209 in FIG. 16) in this case will be described with reference to the flowchart in FIG. 17. Note that this readout area setting process corresponds to the readout area setting process described with reference to the flowchart in FIG. 12. As illustrated in FIG. 17, by replacing the IMU data in the flowchart of FIG. 12 with a motion vector, the example of the flow of the readout area setting process in this case can be described.

That is, when the readout area setting process is started, in step S231, the readout area setting unit 313 estimates a motion vector corresponding to a predetermined frame after the current frame (for example, a next frame) on the basis of a motion vector or the like corresponding to the current frame.

In step S232, the readout area setting unit 313 estimates (a position and a shape (including size) and the like of) a readout area in the predetermined frame after the current frame (for example, the next frame) on the basis of an estimation result or the like of the motion vector corresponding to the predetermined frame after the current frame (for example, the next frame).

Figure 16:
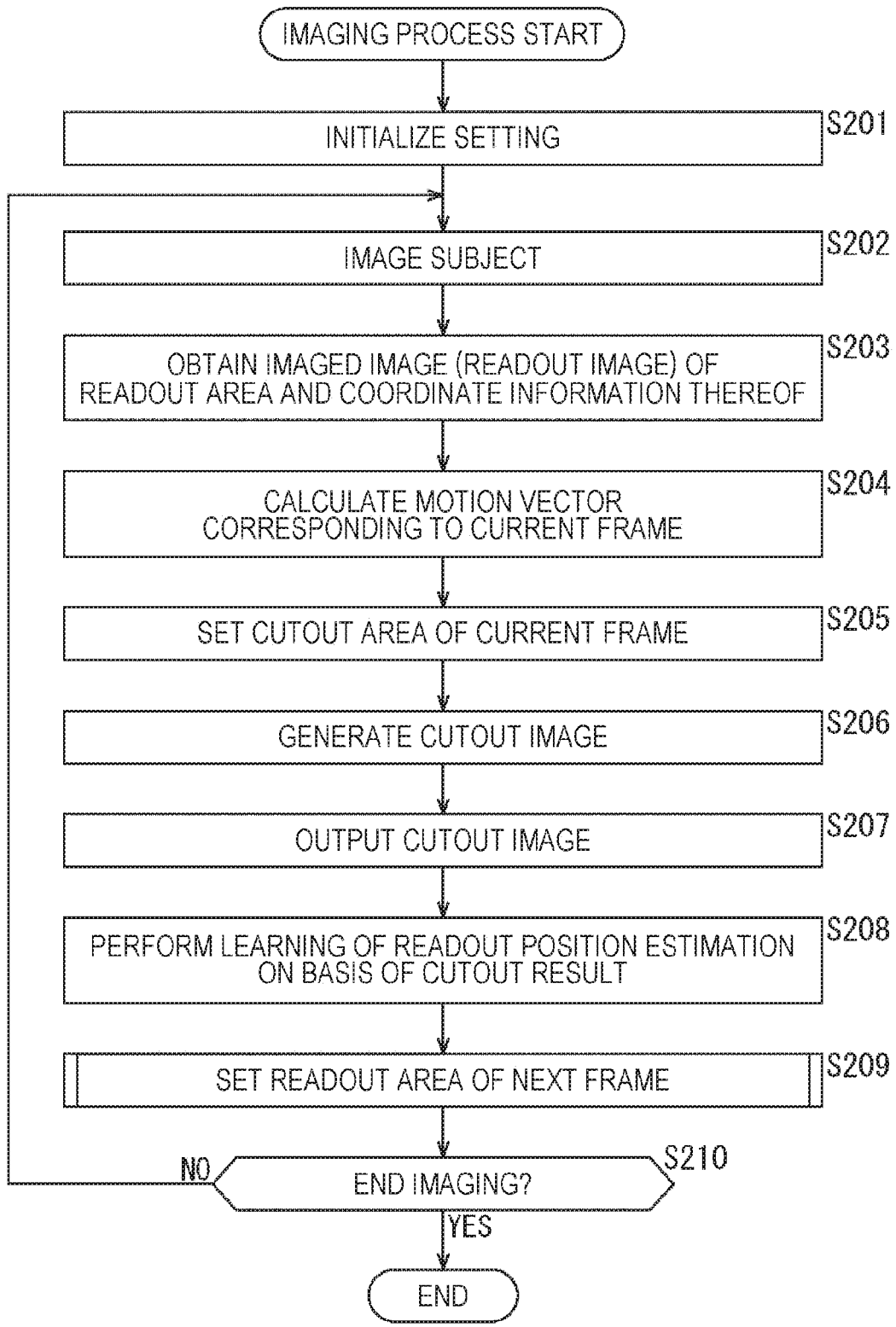
FIG. 16 is a flowchart describing an example of a flow of an imaging process.
Figure 17:
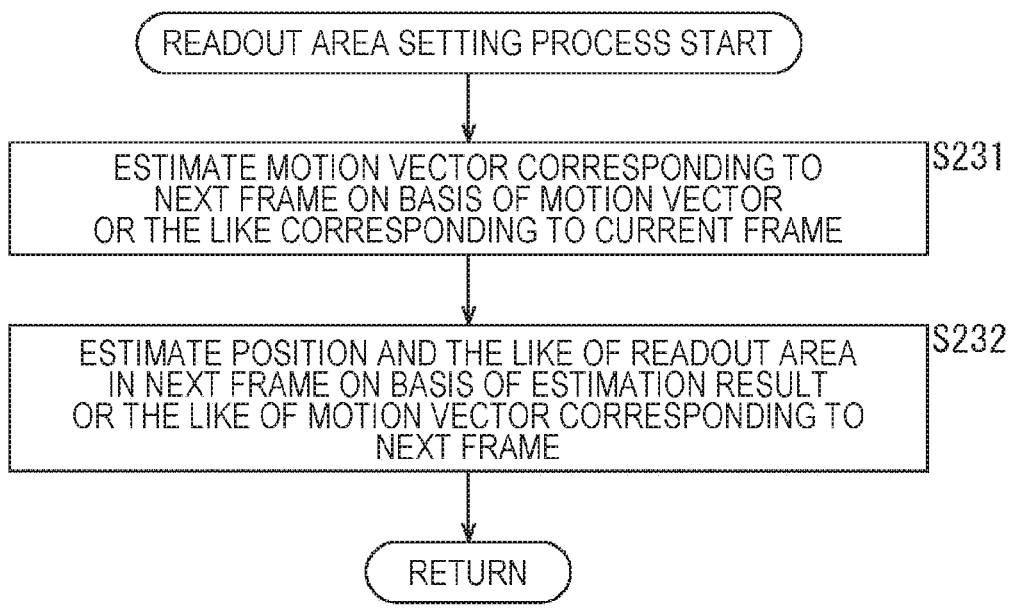
FIG. 17 is a flowchart describing an example of a flow of a readout area setting process.

When the process in step S232 ends, the readout area setting processing ends, and the process returns to FIG. 16.

By executing each process as described above, the image stabilization can be performed using a motion vector. Therefore, the IMU 103 can be omitted, and an increase in cost can be suppressed as compared with the case of the first embodiment.

Note that also in this case, a cutout area of the predetermined frame after the current frame (for example, the next frame) may be estimated on the basis of the motion vector estimation result, and a readout area may be estimated on the basis of an estimation result of the cutout area. In this case, the flow of the readout area setting process corresponds to the flowchart of FIG. 13. That is, similarly to the case of FIG. 17, by replacing the IMU data in the flowchart of FIG. 13 with a motion vector, the example of the flow of the readout area setting process in this case can be described.

Note that in the foregoing, it has been described that the motion vector is calculated (detected) as the motion information, but without being limited thereto, a vanishing point of the imaged image may be detected, and an amount of motion may be detected on the basis of how much the vanishing point has moved. Therefore, the amount of motion can be detected even if no feature point exists in the imaged image. For example, in a case where the imaging device 100 is applied as an on-board camera that can estimate a vanishing point from a lane, the amount of motion can be easily detected in this manner.

4. Third Embodiment

<Imaging Device>

Note that a configuration example of the imaging device 100 is not limited to the example of FIG. 2. For example, the imaging device 100 may display a generated cutout image on a monitor, record the generated cutout image in a memory, or transmit the generated cutout image to another device.

Figure 18:
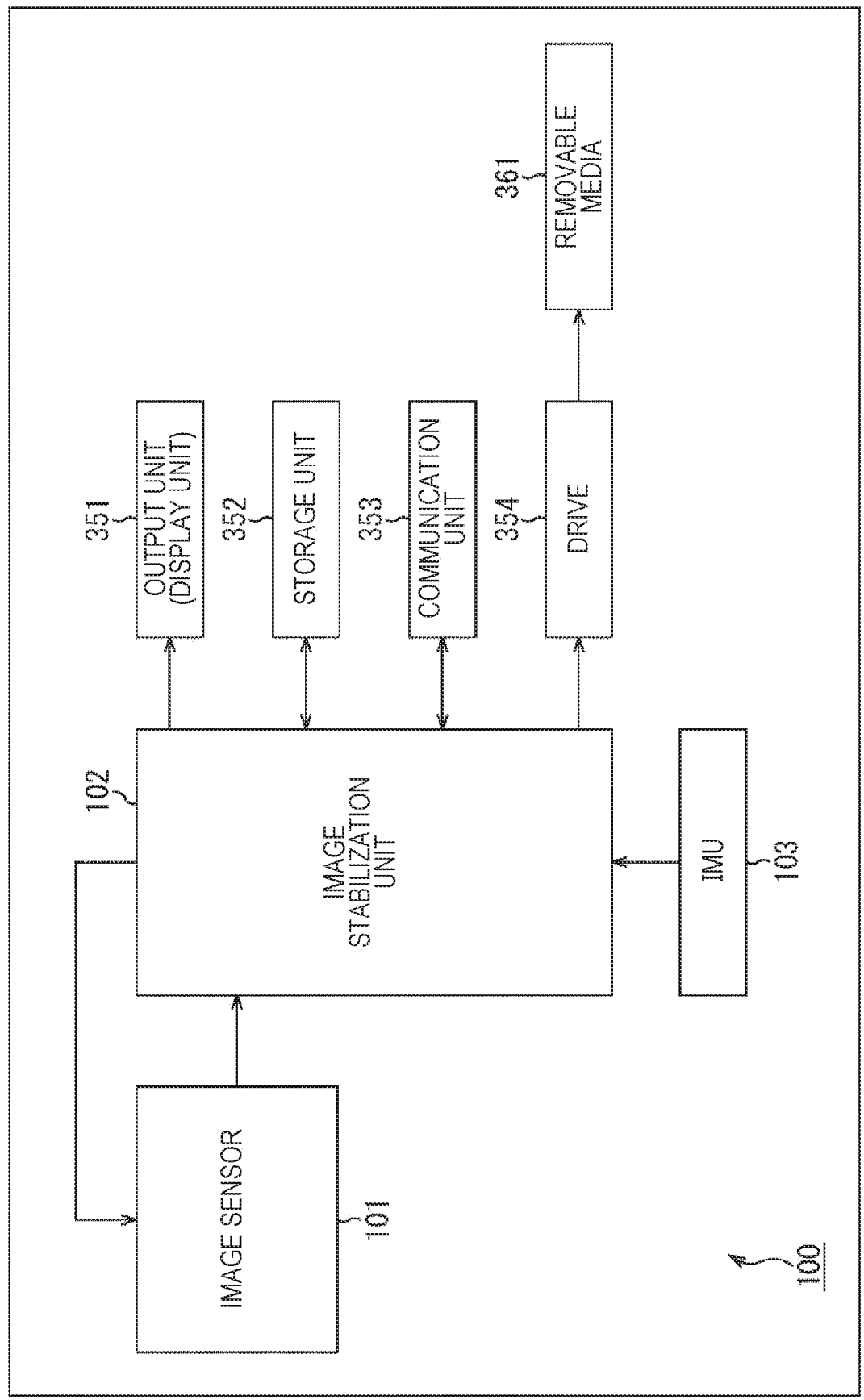
FIG. 18 is a block diagram illustrating a main configuration example of an imaging device.

FIG. 18 is a block diagram illustrating another configuration example of the imaging device 100. As illustrated in FIG. 18, in this case, the imaging device 100 has an output unit (display unit) 351, a recording unit 352, a communication unit 353, and a drive 354 besides the image sensor 101 to the IMU 103.

The output unit (display unit) 351 has, for example, an output device that can output a cutout image, such as a display device that can display a cutout image or a projection device that can project a cutout image, or the like, and performs a process related to output (display or the like) of a cutout image generated by the image stabilization unit 102. For example, the output unit (display unit) 351 displays a cutout image supplied from the image stabilization unit 102 on a monitor or projects it on a projection screen or the like.

The recording unit 352 includes, for example, a hard disk, a Random Access Memory (RAM) disk, a non-volatile memory, and the like and performs a process (writing, reading, and the like) related to recording of a cutout image generated by the image stabilization unit 102. For example, the recording unit 352 records the cutout image supplied from the image stabilization unit 102 in a storage area (memory or the like) thereof. Furthermore, for example, the recording unit 352 supplies the cutout image recorded in the storage area to the image stabilization unit 102.

Note that when a cutout image is recorded, cutout image data may be coded and recorded. When this cutout image is read out, the recording unit 352 reads out and decodes coded data of the cutout image, and supplies the cutout image data to the image stabilization unit 102.

The communication unit 353 includes, for example, a wired or wireless network interface or both of them, and performs a process related to communication with another device that is a communication partner. For example, the communication unit 353 communicates with another device in accordance with a predetermined communication standard, and supplies the cutout image supplied from the image stabilization unit 102 to another device. Furthermore, for example, the communication unit 353 communicates with another device in accordance with a predetermined communication standard, obtains a cutout image from the other device, and supplies the cutout image to the image stabilization unit 102 and the like.

Note that when a cutout image is transmitted to or received from another device in this manner, the cutout image data may be coded. For example, the communication unit 353 may code the cutout image and transmit coded data (or bit stream) to another device. Furthermore, for example, the communication unit 353 may receive coded data of a cutout image transmitted from another device, decode the coded data, and supply cutout image data to the image stabilization unit 102 or the like.

The drive 354 drives, for example, a removable medium 361 such as a magnetic disk, an optical disk, a magneto-optical disk, or a semiconductor memory. For example, the drive 354 records cutout image data supplied from the image stabilization unit 102 on the removable medium 361. At that time, the drive 354 may code the cutout image data, and record coded data thereof on the removable medium 361.

As described above, the imaging device 100 can output a cutout image, record it in a memory, transmit it to another device, or record it on a removable medium.

5. Fourth Embodiment

<Image Processing System>

Note that the image stabilization unit 102 may output a readout image and coordinate information thereof and IMU data up to the present in association with each other without setting a cutout area or generating a cutout image. Then, setting of the cutout area and generation of the cutout image may be performed in a device in a subsequent stage (for example, a server or the like).

Figure 19:
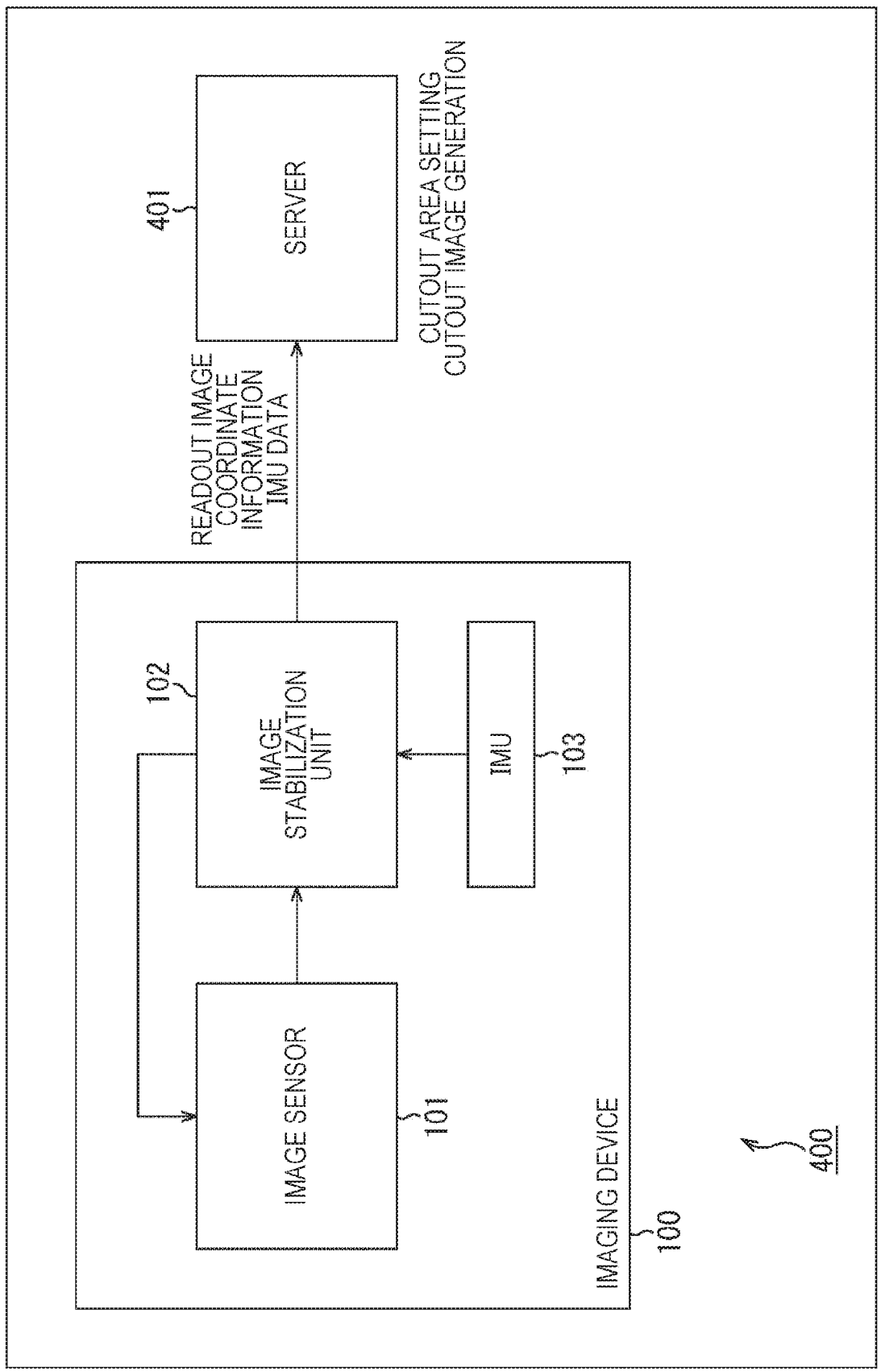
FIG. 19 is a block diagram illustrating a main configuration example of an image processing system.

FIG. 19 is a block diagram illustrating an example of a main configuration of one mode of an image processing system to which the present technology is applied. An image processing system 400 illustrated in FIG. 19 includes an imaging device 100 and a server 401, and performs similar processes to those of the imaging device 100 in FIG. 2 as a whole.

In the case of the image processing system 400 in FIG. 19, the imaging device 100 has an image sensor 101, an image stabilization unit 102, and an IMU 103 similarly to the case of the first embodiment. However, the image stabilization unit 102 in this case supplies the server 401 with a readout image and coordinate information thereof (information regarding the readout area) and IMU data up to the present in association with each other without setting a cutout area or generating a cutout image.

The server 401 obtains such information, and performs processing such as setting of a cutout area and generation of a cutout image on the basis of the obtained information.

<Image Stabilization Unit>

Figure 20:
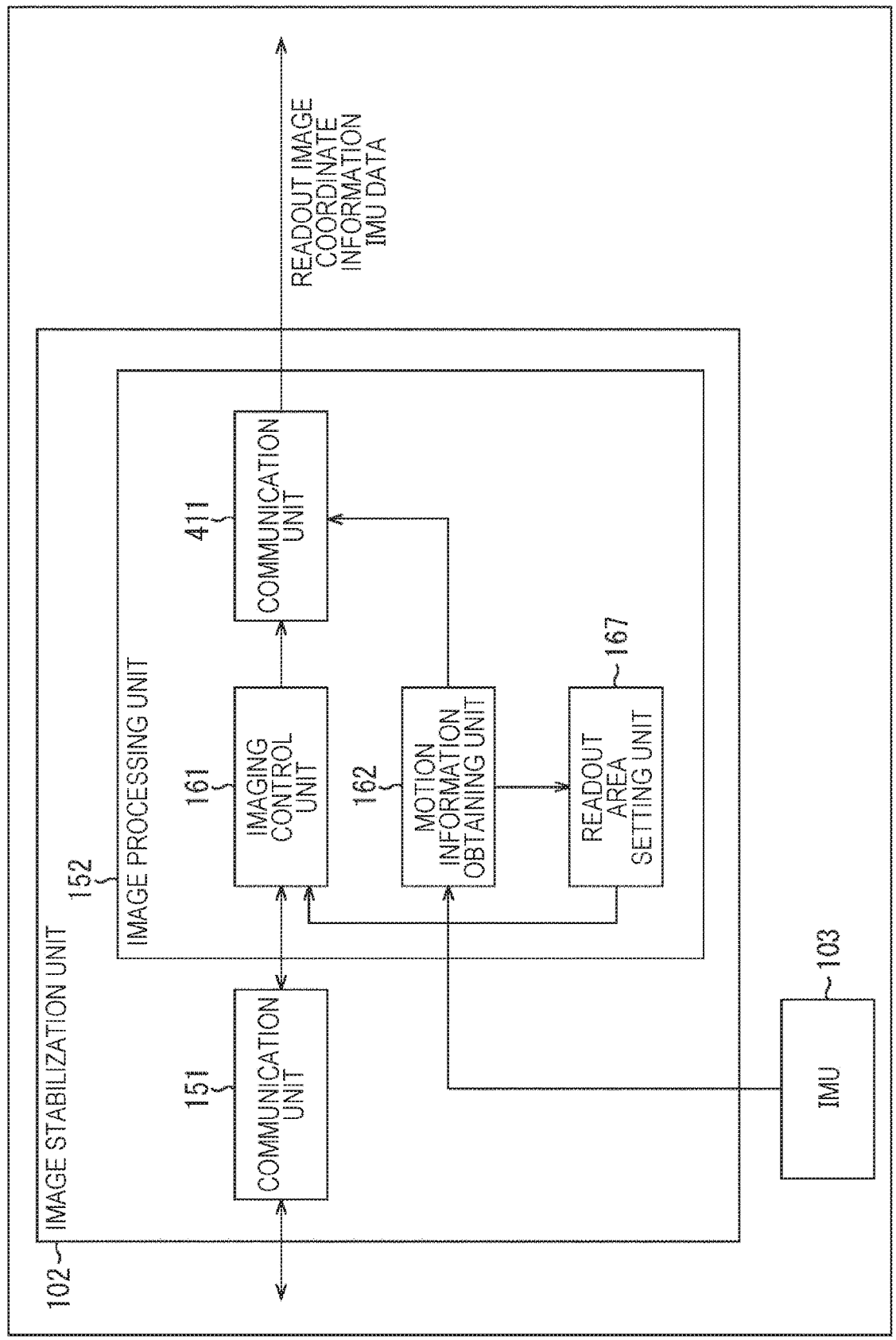
FIG. 20 is a block diagram illustrating a main configuration example of an image stabilization unit.

FIG. 20 illustrates a main configuration example of the image stabilization unit 102 in this case. As illustrated in FIG. 20, also in this case, the image stabilization unit 102 has a communication unit 151 and an image processing unit 152, similarly to the case of FIG. 4. However, unlike the case of FIG. 4, the image processing unit 152 has an imaging control unit 161, a motion information obtaining unit 162, a readout area setting unit 167, and a communication unit 411. In other words, the image processing unit 152 in this case does not have the cutout area setting unit 163 to the learning unit 166.

The imaging control unit 161 basically performs similar processes to those in the case of FIG. 4, but supplies a readout image obtained from the image sensor 101 and information (including coordinate information) regarding a readout area thereof to the communication unit 411.

The motion information obtaining unit 162 basically performs similar processes to those in the case of FIG. 4, but supplies motion information (IMU data up to the present) obtained from the IMU 103 to the communication unit 411 and the readout area setting unit 167.

The readout area setting unit 167 basically performs similar processes as those in the case of FIG. 4, and sets a readout area of a predetermined frame after the frame to be processed on the basis of the motion information up to the present. The readout area setting unit 167 supplies information regarding the set readout area to the imaging control unit 161.

The communication unit 411 communicates with the server 401 in accordance with a predetermined communication standard, and transmits the readout image and the information (including coordinate information) regarding the readout area thereof and the IMU data up to the present to the server 401.

Thus, since the processes related to setting of the cutout area and generation of the cutout image can be omitted, the imaging device 100 can suppress an increase in load due to image stabilization.

<Server>

Figure 21:
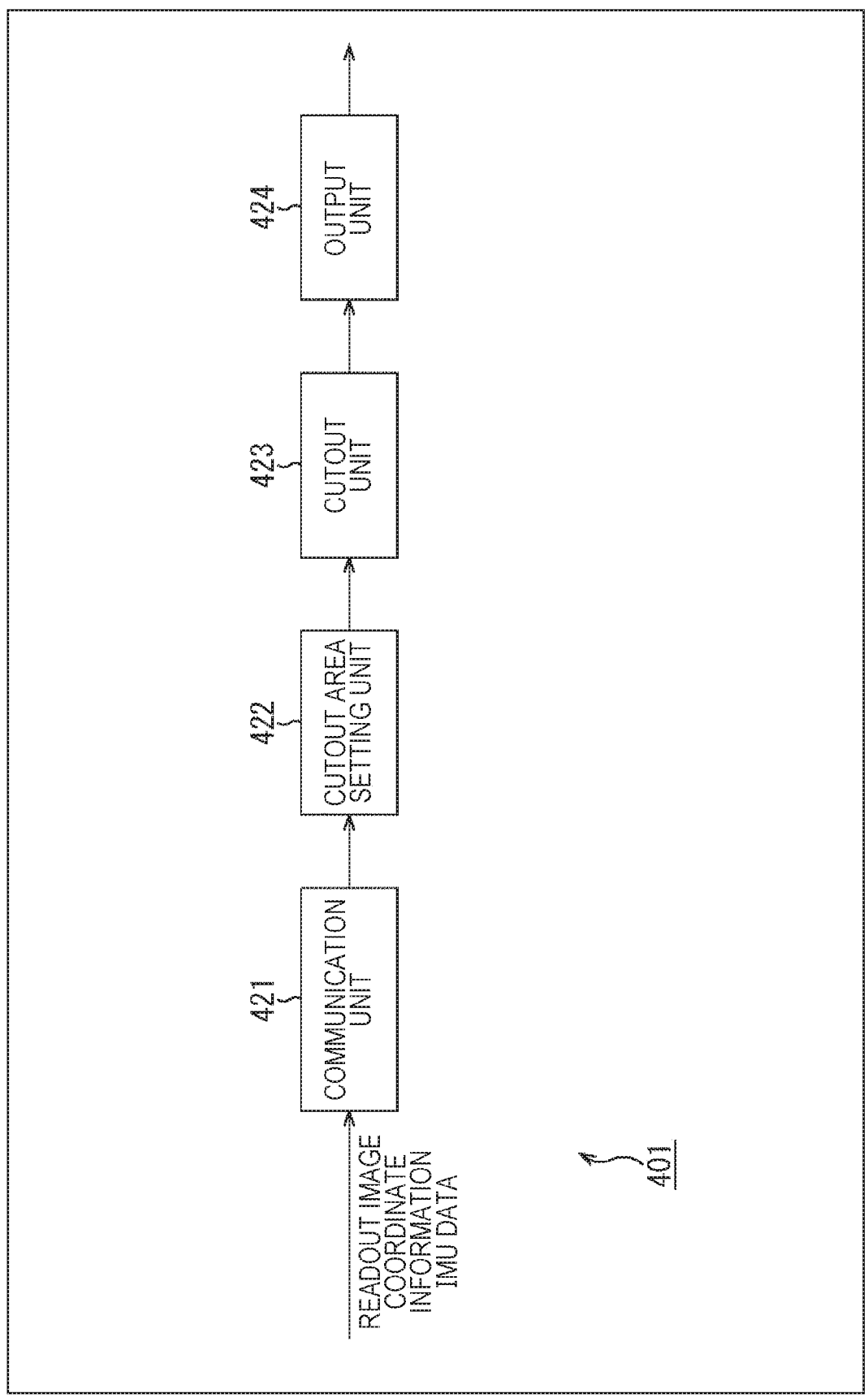
FIG. 21 is a block diagram illustrating a main configuration example of a server.

FIG. 21 is a block diagram illustrating a main configuration example of the server 401. As illustrated in FIG. 21, the server 401 has a communication unit 421, a cutout area setting unit 422, a cutout unit 423, and an output unit 424.

The communication unit 421 communicates with the imaging device 100 in accordance with a predetermined communication standard, and receives a readout image and information (including coordinate information) regarding a readout area thereof and the IMU data up to the present, which are transmitted from the imaging device 100. The communication unit 421 supplies the received information to the cutout area setting unit 422.

The cutout area setting unit 422 basically performs similar processes to those of the cutout area setting unit 163 (FIG. 4), and sets a cutout area by using the information supplied from the communication unit 421 to suppress motion of a subject in the cutout image in the readout image (to stabilize the cutout image). The cutout area setting unit 422 supplies the information regarding the set cutout area to the cutout unit 423 together with the information supplied from the communication unit 421.

The cutout unit 423 basically performs similar processes to those of the cutout unit 164 (FIG. 4), cuts out an image of the cutout area set by the cutout area setting unit 422 from the readout image, and generates a cutout image. The cutout unit 423 supplies the generated cutout image to the output unit 424.

The output unit 424 basically performs similar processes to those of the output unit 165 (FIG. 4), and outputs data of cutout image (cutout image data) to the outside of the server 401 via an output interface. Furthermore, for example, the output unit 424 has an output device such as a monitor or a speaker, and displays a cutout image on the monitor, or outputs a sound or the like corresponding to the cutout image from the speaker.

Thus, by performing the processes related to setting of the cutout area and generation of the cutout image in the relatively high-performance server 401, these processes can be omitted in the relatively low-performance imaging device 100, and thus the imaging device 100 can suppress an increase in load due to image stabilization.

<Flow of Imaging Process>

Figure 22:
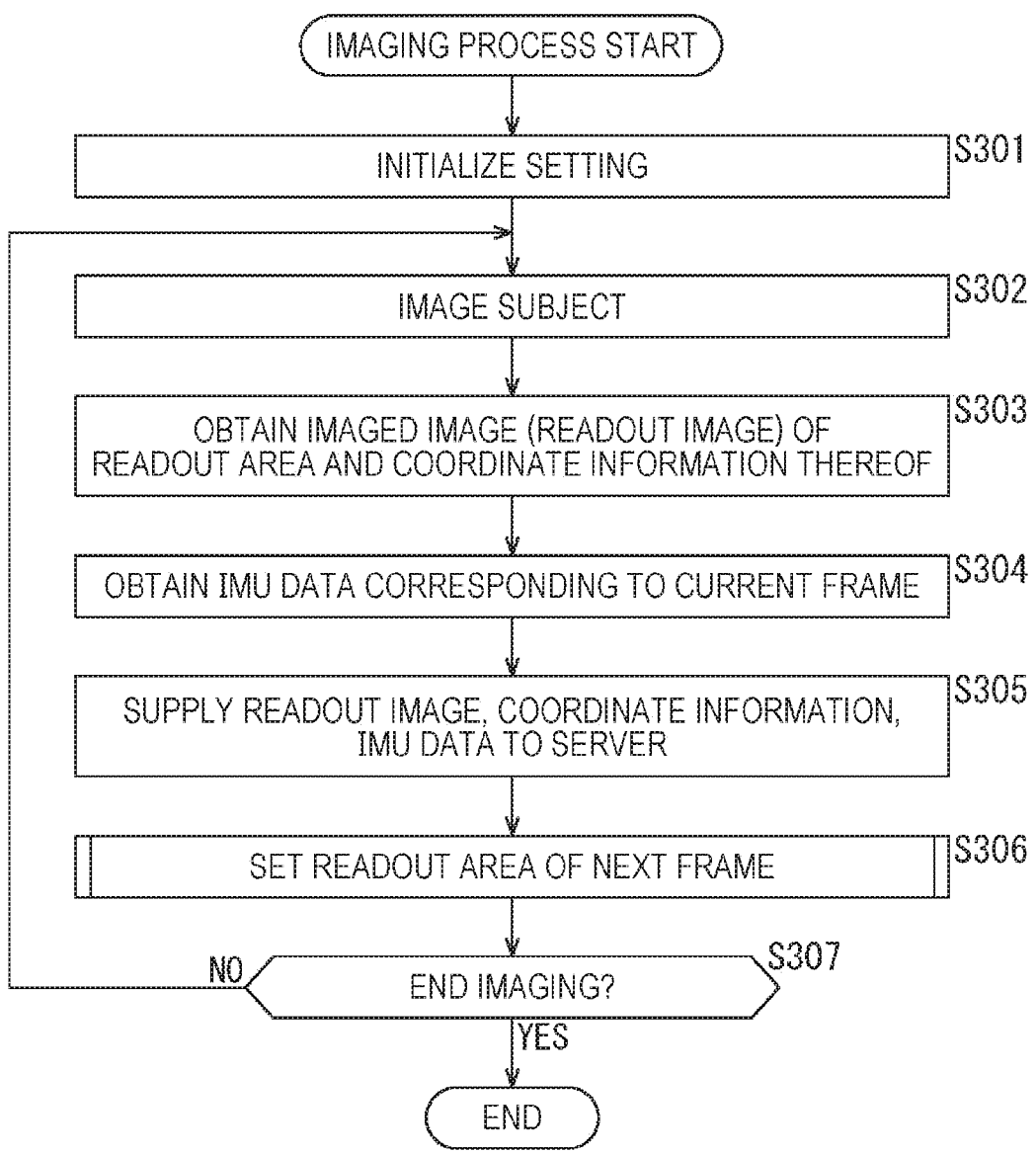
FIG. 22 is a flowchart describing an example of a flow of an imaging process.

An example of a flow of an imaging process executed by the imaging device 100 in this case will be described with reference to a flowchart in FIG. 22.

When the imaging process is started, respective processes in steps S301 to S304 are executed similarly to respective processes in steps S101 to S104 in FIG. 11.

In step S305, the communication unit 411 supplies the server 401 with the readout image and the coordinate information obtained by the process in step S303 and the IMU data up to the present obtained by the process in step S304 in association with each other.

Respective processes in step S306 and step S307 are executed similarly to respective processes in step S109 and step S110 in FIG. 11.

That is, if it is determined not to end the imaging in step S307, the imaging control unit 161 supplies information regarding the readout area set in step S306 to the image sensor 101, and causes the image sensor 101 to set the readout area. That is, the setting of the readout area is updated. When the setting of the readout area is updated, the imaging control unit 161 returns the process to step S302, and repeats the subsequent processes.

Furthermore, if it is determined to end the imaging in step S307, the imaging process ends.

<Flow of Cutout Process>

Figure 23:
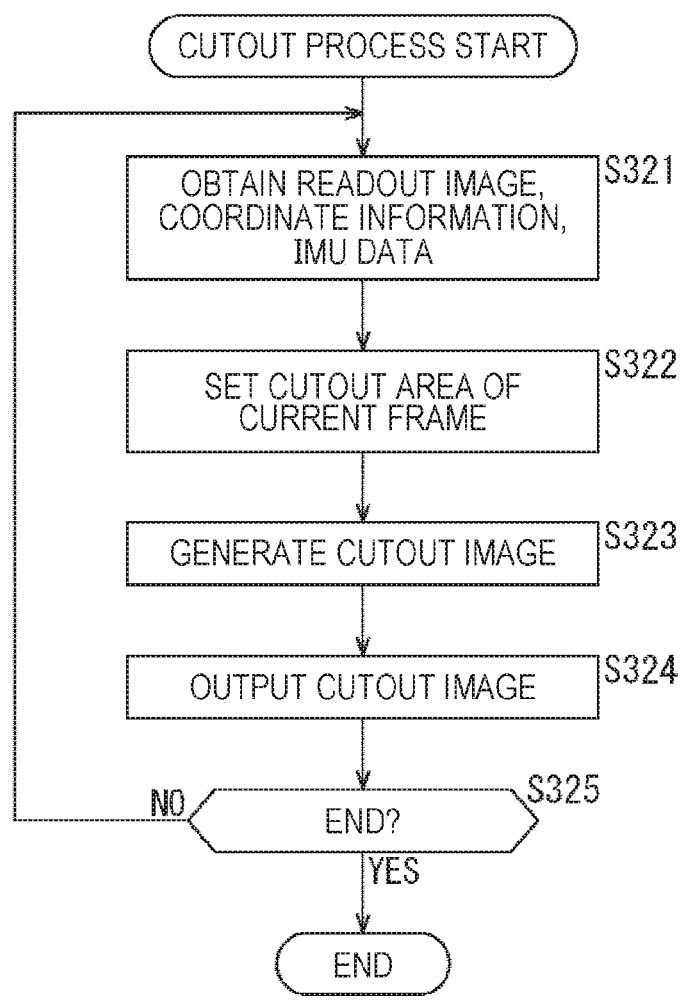
FIG. 23 is a flowchart describing an example of a flow of a cutout process.

Next, an example of a flow of a cutout process executed by the server 401 will be described with reference to a flowchart in FIG. 23.

When the cutout process is started, in step S321, the communication unit 421 obtains a readout image, information (including coordinate information) regarding a readout area, and IMU data up to the present from the imaging device 100.

In step S322, the cutout area setting unit 422 sets a cutout area of the current frame so that variation (shake) in position of a subject is suppressed on the basis of the readout image obtained in step S321 and the coordinate information thereof, as well as the IMU data up to the present, similarly to the case of step S105 (FIG. 11).

In step S323, the cutout unit 423 cuts out an image of the cutout area set by the process in step S322 from the readout image obtained in step S321 similarly to the case of step S106 (FIG. 11), and generates a cutout image.

In step S324, the output unit 424 outputs the cutout image generated by the process in step S323, similarly to the case of step S107 (FIG. 11).

In step S325, the communication unit 421 determines whether or not to end the cutout process. If it is determined that the transmission of information such as the readout image from the imaging device 100 is continued and the cutout process is not ended, the process returns to step S321, and the subsequent processes are repeated.

In step S325, if it is determined to end the cutout process such as when transmission of information such as the readout image from the imaging device 100 is terminated, the cutout process ends.

By executing each process as described above, the image processing system 400 can suppress an increase in load due to image stabilization, similarly to the case of the imaging device 100 according to the first embodiment.

6. Fifth Embodiment

<Image Processing Device>

Note that the present technology can be applied to an image processing device other than an imaging device. It is sufficient if at least setting of a readout area or setting of a cutout area can be performed. For example, the readout area setting unit 167 and the cutout area setting unit 163 of the imaging device 100 according to the first embodiment may be an image processing device that is separate from the imaging device 100.

Figure 24:
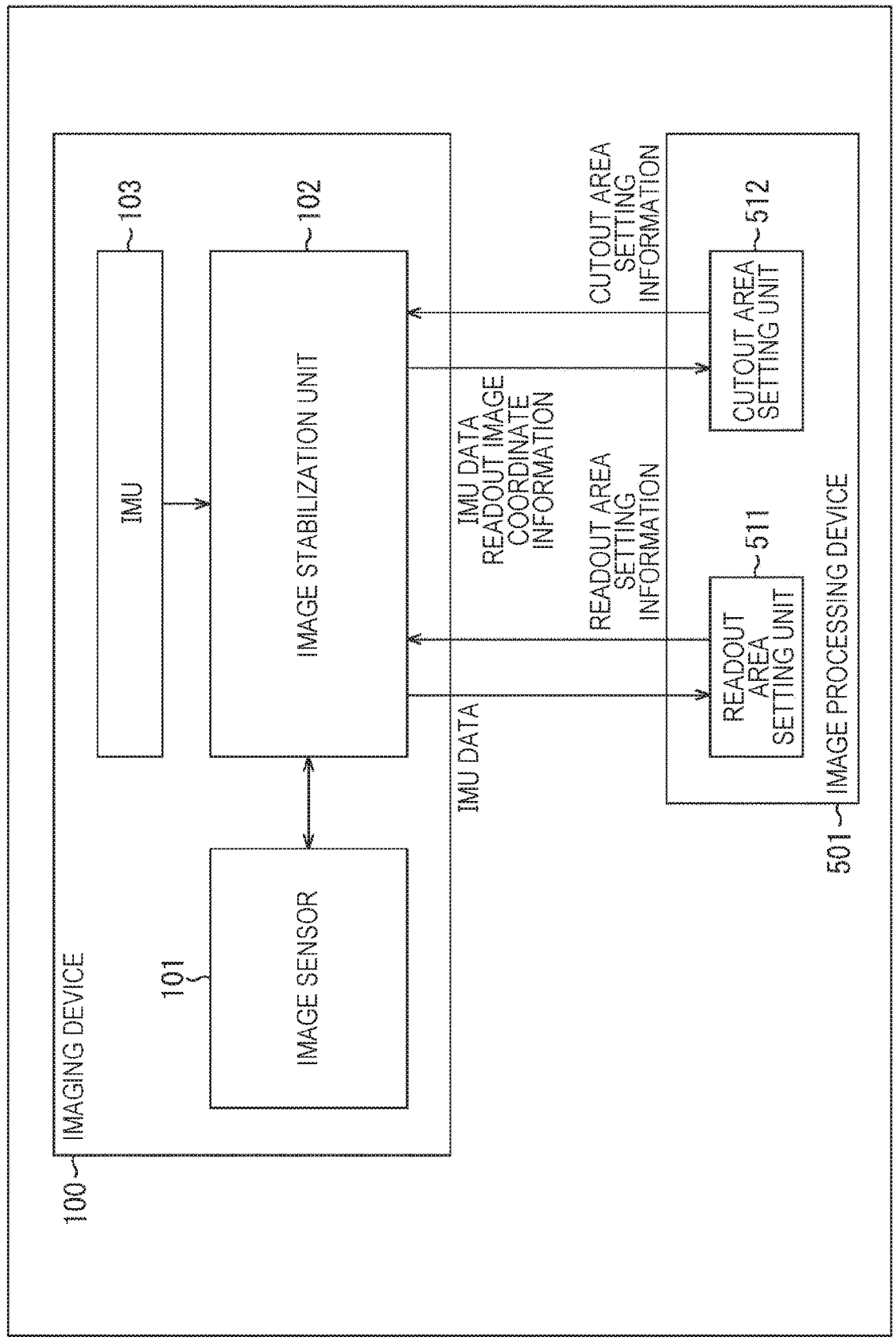
FIG. 24 is a block diagram illustrating a main configuration example of an image processing device.

FIG. 24 is a block diagram illustrating an example of a main configuration of one mode of an image processing device to which the present technology is applied. An image processing device 501 illustrated in FIG. 24 is an image processing device that sets a readout area and a cutout area to the imaging device 100 (the image sensor 101 thereof).

The image processing device 501 has a readout area setting unit 511 and a cutout area setting unit 512.

The readout area setting unit 511 is a processing unit similar to the readout area setting unit 167, and performs similar processes. For example, the readout area setting unit 511 obtains the IMU data up to the present from the image stabilization unit 102 of the imaging device 100, and sets a readout area of a predetermined frame after the frame to be processed on the basis of information thereof. Then, the readout area setting unit 511 supplies information regarding the readout area (readout area setting information) to the image stabilization unit 102. The imaging device 100 generates a readout image in the readout area.

Furthermore, the cutout area setting unit 512 is a processing unit similar to the cutout area setting unit 163, and performs similar processes. For example, the cutout area setting unit 512 obtains, from the image stabilization unit 102 of the imaging device 100, the readout image and information (including coordinate information) regarding the readout area and the IMU data up to the present, and sets a cutout area of the frame to be processed on the basis of these pieces of information. Then, the cutout area setting unit 512 supplies the information regarding the cutout area (cutout area setting information) to the image stabilization unit 102. The imaging device 100 generates a cutout image in the cutout area.

Note that in this case, the readout area setting unit 167 and the cutout area setting unit 163 of the image stabilization unit 102 of the imaging device 100 can be omitted.

Even with such a configuration, the image processing device 501 can cause the imaging device 100 to read out a readout image from the image sensor 101 and generate a cutout image in which the image is stabilized using the readout image. Therefore, the image processing device 501 can suppress an increase in load due to image stabilization of the imaging device 100, similarly to the case of the first embodiment.

7. Sixth Embodiment

<Stacked Image Sensor>

Note that the present technology may be achieved, for example, as a package (chip) in which a semiconductor substrate is sealed, a module in which the package (chip) is installed on a circuit substrate, or the like. For example, in a case of being achieved as the package (chip), an imaging element in the package (chip) may have a single semiconductor substrate, or may have a plurality of semiconductor substrates overlapped with each other.

Figure 25B:
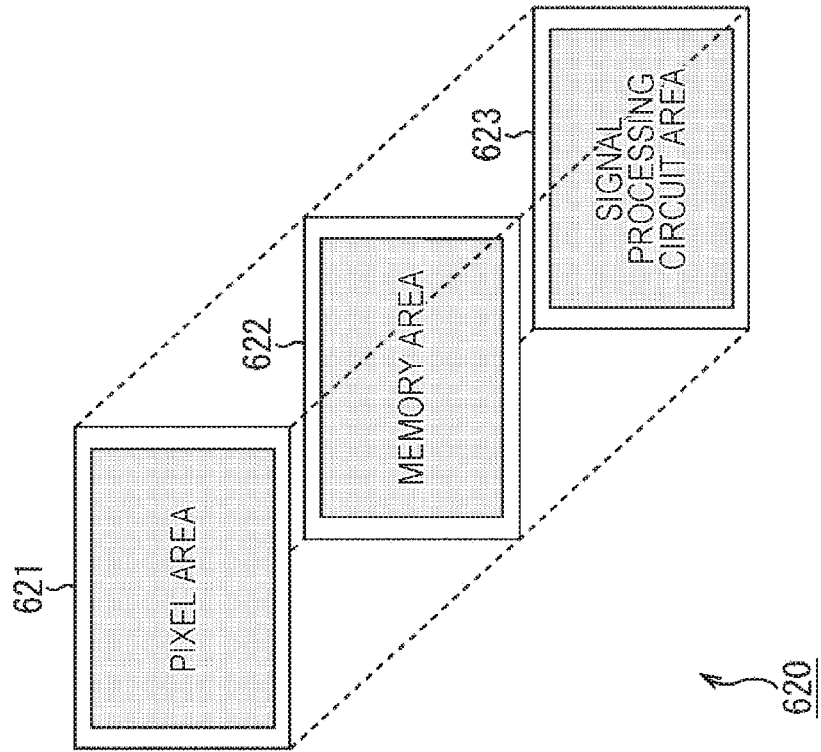
FIGS. 25A and 25B is a diagram illustrating a main configuration example of a stacked image sensor.
Figure 25A:
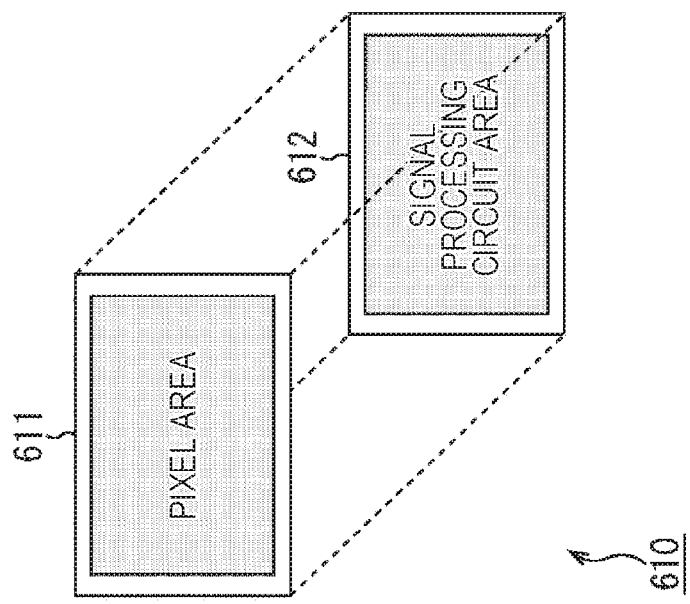

FIGS. 25A and 25B are diagrams illustrating an example of a physical configuration of a stacked image sensor to which the present technology is applied. For example, the stacked image sensor 610 illustrated in FIG. 25A has two semiconductor substrates (a stacked substrate (a pixel substrate 611 and a circuit substrate 612)) that are overlapped with each other. For example, a pixel area 136 (FIG. 3) of the image sensor 101 of the imaging device 100 is formed in a pixel area of the pixel substrate 611, and other components of the image sensor 101 (FIG. 3) and the image stabilization unit 102 and the IMU 103 may be formed in a signal processing circuit area of the circuit substrate 612. With such a configuration, a large pixel area can be made.

Note that the number (the number of layers) of the semiconductor substrates (stacked substrates) is arbitrary, and may be, for example, three or more. For example, a stacked image sensor 620 with a memory illustrated in FIG. 25B has three semiconductor substrates (stacked substrates (a pixel substrate 621, a memory substrate 622, and a circuit substrate 623)) that are overlapped with each other. For example, a pixel area 136 (FIG. 3) of the image sensor 101 of the imaging device 100 may be formed in a pixel area of the pixel substrate 621, a memory area for storing a readout image (imaged image) and the like may be formed in a memory area of the memory substrate 622, and other components of the image sensor 101 (FIG. 3), the image stabilization unit 102, and the IMU 103 may be formed in a signal processing circuit area of the circuit substrate 623. With such a configuration, a large pixel area can be made.

8. Appendix

<Computer>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 26:
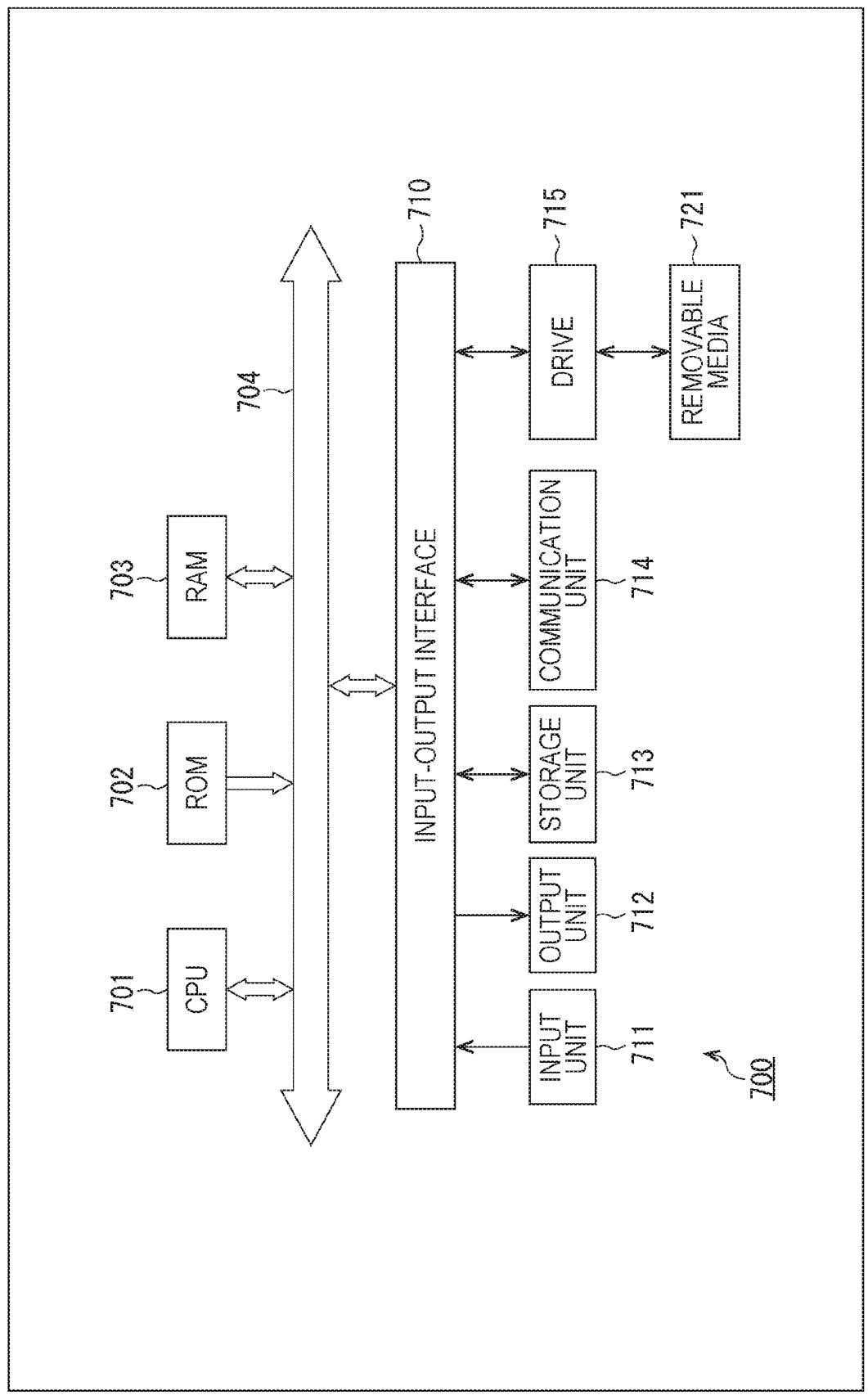
FIG. 26 is a block diagram illustrating a main configuration example of a computer.

FIG. 26 is a block diagram illustrating a configuration example of hardware of a computer that executes the above-described series of processes by a program.

In the computer 700 illustrated in FIG. 26, a central processing unit (CPU) 701, a read only memory (ROM) 702, and a random access memory (RAM) 703 are interconnected via a bus 704.

An input-output interface 710 is also connected to the bus 704. An input unit 711, an output unit 712, a storage unit 713, a communication unit 714, and a drive 715 are connected to the input-output interface 710.

The input unit 711 includes, for example, a keyboard, a mouse, a microphone, a touch panel, an input terminal, and the like. The output unit 712 includes, for example, a display, a speaker, an output terminal, and the like. The storage unit 713 includes, for example, a hard disk, a RAM disk, a nonvolatile memory, and the like. The communication unit 714 includes, for example, a network interface. The drive 715 drives a removable medium 721 such as a magnetic disk, an optical disk, a magneto-optical disk, or a semiconductor memory.

In the computer as described above, the CPU 701 loads, for example, a program stored in the storage unit 713 into the RAM 703 via the input-output interface 710 and the bus 704, and executes the program, so as to perform the above-described series of processes. The RAM 703 also appropriately stores data necessary for the CPU 701 to execute various processes, and the like.

The program executed by the computer (CPU 701) can be recorded to, for example, a removable medium 721 as a package medium or the like for application. In that case, the program can be installed in the storage unit 713 via the input-output interface 710 by attaching the removable medium 721 to the drive 715.

Furthermore, this program can be provided via a wired or wireless transmission medium such as a local area network, the Internet, or digital satellite broadcasting. In that case, the program can be received by the communication unit 714 and installed in the storage unit 713.

In addition, this program can be installed in the ROM 702 or the storage unit 713 in advance.

<Applicable Target of the Present Technology>

Note that the system, device, processing unit, and the like to which the present technology is applied can be used in any fields, for example, traffic, medical care, crime prevention, agriculture, livestock industry, mining, beauty, factory, household appliance, weather, nature monitoring, and the like. Furthermore, its use is arbitrary.

For example, the present technology can be applied to systems and devices used for providing contents for appreciation and the like. Further, for example, the present technology can also be applied to systems and devices used for traffic, such as traffic condition management and autonomous driving control. Moreover, for example, the present technology can also be applied to systems and devices used for security. Further, for example, the present technology can be applied to a system or device used for automatic control of a machine or the like. Moreover, for example, the present technology can also be applied to systems and devices provided for use in agriculture and livestock industry. Furthermore, the present technology can also be applied to systems and devices that monitor, for example, a state of natural such as a volcano, a forest, and the ocean, wildlife, and the like. Moreover, for example, the present technology can also be applied to systems and devices used for sports.

For example, the technology (the present technology) according to the present disclosure may be achieved as a device (or a system) mounted on any type of mobile object such as an automobile, an electric vehicle, a hybrid electric vehicle, a motorcycle, a bicycle, a personal mobility, an airplane, a drone, a ship, a robot, and the like.

For example, a vehicle control device (or a vehicle control system) may be capable of calculating a control target value of a driving force generating device, a steering mechanism, or a braking device, and performing cooperative control for the purpose of implementing the function of advanced driver assistance system (ADAS) including collision avoidance or shock mitigation of a vehicle, following traveling on the basis of an inter-vehicle distance (for example, automatic braking control (including following stop control), automatic acceleration control (including following starting control), and the like), vehicle speed maintaining traveling, vehicle collision warning (for example, warning of collision against an obstacle by voice or image, or the like), or warning of vehicle lane deviation and alert display of a nearby pedestrian, and the like on the basis of a cutout image (imaged image having undergone image stabilization) obtained by the imaging device 100 (or a device to which the present technology described in other embodiments is applied) mounted on a moving object (or on the basis of information obtained from the cutout image).

Furthermore, for example, a vehicle control device (or a vehicle control system) may be capable of performing cooperative control for the purpose of autonomous driving or the like to autonomously travel, without depending on operation by driver, by controlling a driving force generation device, a steering mechanism, a braking device, and the like on the basis of a cutout image (imaged image having undergone image stabilization) obtained by the imaging device 100 (or a device to which the present technology described in other embodiments is applied) mounted on a moving object (or on the basis of information obtained from the cutout image).

Moreover, for example, a vehicle control device (or a vehicle control system) may be capable of performing cooperative control for the purpose of antidazzling, such as detecting the position of a preceding vehicle or oncoming vehicle, controlling the headlamp according to the position, and switching the high beam to the low beam, on the basis of a cutout image (imaged image having undergone image stabilization) obtained by the imaging device 100 (or a device to which the present technology described in other embodiments is applied) mounted on a moving object (or on the basis of information obtained from the cutout image).

<Others>

Note that the embodiments of the present technology are not limited to the above-described embodiments, and various modifications are possible without departing from the gist of the present technology.

For example, the present technology can be implemented as any component that constitutes a device or a system, for example, a processor as system large scale integration (LSI) or the like (for example, a video processor), a module using a plurality of processors or the like (for example, a video module), a unit using a plurality of modules or the like (for example, a video unit), a set obtained by further adding other functions to the unit (for example, a video set), and the like (that is, a configuration of a part of the device).

Note that in the present description, the system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are all systems.

Further, for example, a configuration described as one device (or processing unit) may be divided and configured as a plurality of devices (or processing units). Conversely, configurations described above as a plurality of devices (or processing units) may be configured as one device (or processing unit). Furthermore, a configuration other than those described above may be added to the configuration of each device (or each processing unit). Moreover, if the configuration and operation of the entire system are substantially the same, a part of the configuration of a certain device (or processing unit) may be included in the configuration of another device (or another processing unit).

Furthermore, for example, the present technology can take a cloud computing configuration in which one function is processed in a shared and collaborative manner by a plurality of devices via a network. For example, application to a cloud service that provides a service related to an imaged image (moving image) is possible for any terminal such as a computer, an audio visual (AV) device, a portable information processing terminal, an Internet of Things (IoT) device, and the like.

Furthermore, for example, the above-described program can be executed by an arbitrary device. In that case, it is sufficient if the device has necessary functions (functional blocks and the like) and can obtain necessary information.

Furthermore, for example, respective steps described in the above-described flowcharts can be executed by one device or can be executed in a shared manner by a plurality of devices. Moreover, in a case where a plurality of processes is included in one step, the plurality of processes included in the one step can be executed in a shared manner by a plurality of devices in addition to being executed by one device. In other words, a plurality of processes included in one step can be executed as a plurality of steps. Conversely, a process described as a plurality of steps can be collectively executed as one step.

Note that the program executed by the computer may be configured so that the processes in the steps for describing the program are executed in chronological order according to the order described in the present description, or may be executed in parallel or individually at a necessary timing such when being called. That is, as long as no contradiction occurs, the processes in the respective steps may be performed in an order different from the above-described orders. Moreover, the processes in steps for describing this program may be executed in parallel with processes in another program, or may be executed in combination with processes in another program.

Note that the plurality of present technologies which has been described in the present description can each be implemented independently as a single unit as long as no contradiction occurs. Of course, any one or more of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above.

Note that the present technology can have configurations as follows.

(1) An image processing device including:
a readout area setting unit that sets a readout area, which is an area from which an image is read out, in an imaging area formed by a plurality of pixels on the basis of motion prediction information for a predetermined frame after a frame to be processed; and
a cutout area setting unit that sets a cutout area to cut out a partial image from a readout image read out from the readout area of the frame to be processed set by the readout area setting unit.

(2) The image processing device according to (1), in which the readout area setting unit sets a position and a shape of the readout area.

(3) The image processing device according to (1) or (2), in which
the readout area setting unit estimates motion information up to the predetermined frame on the basis of motion information up to present as the motion prediction information, and sets the readout area on the basis of the motion information estimated.

(4) The image processing device according to (3), in which
the readout area setting unit estimates the motion information up to the predetermined frame according to predetermined regularity on the basis of the motion information up to the present.

(5) The image processing device according to any one of (1) to (4), in which
the readout area setting unit estimates the cutout area in the predetermined frame on the basis of the motion prediction information, and sets the readout area to include the cutout area estimated.

(6) The image processing device according to (5), in which
the readout area setting unit sets a size of the readout area according to an amount of rotation of the cutout area estimated.

(7) The image processing device according to any one of (1) to (6), in which
the cutout area setting unit sets a position and a shape of the cutout area.

(8) The image processing device according to any one of (1) to (7), in which
the cutout area setting unit sets the cutout area in the readout area of the frame to be processed.

(9) The image processing device according to (8), in which
the cutout area setting unit sets the cutout area at a position closest in a motion direction to a position of a cutout area corresponding to motion information up to present in the readout area of the frame to be processed.

(10) The image processing device according to any one of (1) to (9), in which
the cutout area setting unit sets the cutout area of the frame to be processed on the basis of motion information up to present and information regarding the readout area of the frame to be processed set by the readout area setting unit.

(11) The image processing device according to (10), in which
the information regarding the readout area includes information regarding a position and a shape of the readout area.

(12) The image processing device according to any one of (1) to (11), in which
the readout area setting unit sets the readout area for a frame next to a frame to be processed, and the cutout area setting unit sets the cutout area of the frame to be processed.

(13) The image processing device according to any one of (1) to (12), in which
a cutout unit that cuts out a partial image of the cutout area set by the cutout area setting unit from the readout image.

(14) The image processing device according to any one of (1) to (13), further including
a learning unit that further performs learning related to setting of the readout area by the readout area setting unit on the basis of a setting result of the cutout area by the cutout area setting unit, in which
the readout area setting unit sets the readout area by reflecting a learning result by the learning unit.

(15) An image processing device according to any one of (1) to (14), further including
an imaging control unit that causes an imaging unit to image a subject and obtains the readout image that is an imaged image obtained in the readout area of the imaging area of the imaging unit.

(16) The image processing device according to (15), in which
the imaging control unit supplies the imaging unit with information regarding the readout area set by the readout area setting unit, and the imaging unit images a subject and generates an imaged image of the readout area indicated by the supplied information regarding the readout area.

(17) The image processing device according to (16), in which the imaging control unit supplies, during a vertical blanking period, the imaging unit with information regarding the readout area of a frame next to the frame to be processed.

(18) The image processing device according to (16) or (17), in which the information regarding the readout area includes information regarding a position and a shape of the readout area.

(19) The image processing device according to any one of (15) to (18), in which the imaging control unit obtains information regarding the readout area together with the readout image.

(20) The image processing device according to (19), in which the information regarding the readout area includes information regarding a position and a shape of the readout area.

(21) The image processing device according to any one of (15) to (20), further including an imaging unit that images a subject, in which the imaging control unit causes the imaging unit to image a subject and obtains the readout image.

(22) The image processing device according to any one of (1) to (21), further including an obtaining unit that obtains measurement data related to motion and posture of an imaging unit measured by a measurement unit, in which the readout area setting unit estimates the motion prediction information on the basis of the measurement data related to motion and posture of the imaging unit obtained by the obtaining unit, and sets the readout area on the basis of the motion prediction information estimated.

(23) The image processing device according to (22), in which the cutout area setting unit sets the cutout area of the frame to be processed on the basis of motion information up to present corresponding to the measurement data related to motion and posture of the imaging unit obtained by the obtaining unit.

(24) The image processing device according to (22) or (23), further including the measurement unit.

(25) The image processing device according to any one of (1) to (24), further including a motion vector detection unit that detects a motion vector between frames of the imaged image, in which the readout area setting unit sets the readout area on the basis of the motion vector detected by the motion vector detection unit.

(26) The image processing device according to (25), in which the cutout area setting unit sets the cutout area of the frame to be processed on the basis of the motion vector detected by the motion vector detection unit.

(27)

An image processing method including:

setting a readout area, which is an area from which an image is read out, in an imaging area formed by a plurality of pixels on the basis of motion prediction information for a predetermined frame after a frame to be processed; and setting a cutout area to cut out a partial image from a readout image read out from the readout area of the set frame to be processed.

(28) An image processing system including:

an imaging device that images a subject; and an image processing device that performs image processing, in which the image processing system further has:

a readout area setting unit that sets a readout area, which is an area from which an image is read out, in an imaging area formed by a plurality of pixels on the basis of motion prediction information for a predetermined frame after a frame to be processed; and a cutout area setting unit that sets a cutout area to cut out a partial image from a readout image read out from the readout area of the frame to be processed set by the readout area setting unit.

REFERENCE SIGNS LIST

100 Imaging device
101 Image sensor
102 Image stabilization unit
103 IMU
131 Communication unit
132 System control unit
133 Line scanning unit
134 Column scanning unit
135 ADC
136 Pixel area
151 Communication unit
152 Image processing unit
161 Imaging control unit
162 Motion information obtaining unit
163 Cutout area setting unit
164 Cutout unit
165 Output unit
166 Learning unit
167 Readout area setting unit
311 Motion vector calculation unit
312 Cutout area setting unit
313 Readout area setting unit
351 Output unit
352 Recording unit
353 Communication unit
354 Drive
361 Removable medium
401 Server
411 Communication unit
421 Communication unit
422 Cutout area setting unit
423 Cutout unit
424 Output unit
501 Image processing device
511 Readout area setting unit
512 Cutout area setting unit
610 Stacked image sensor
620 Stacked image sensor with memory
700 Computer

The invention claimed is:

1. An image processing device, comprising:
a central processing unit (CPU) configured to:
estimate a cutout area in a determined frame based on motion prediction information for the determined frame, wherein the determined frame is subsequent to a current frame;
set, for the current frame, a readout area in an imaging area based on the estimated cutout area, wherein the readout area includes the estimated cutout area, and by the imaging area includes a plurality of pixels;

obtain a readout image based on the readout area of the current frame; and set the cutout area to cut out a partial image from the readout image.

2. The image processing device according to claim 1, wherein the CPU is further configured to set a position and a shape of the readout area.

3. The image processing device according to claim 1, wherein the CPU is further configured to:

estimate motion information up to the determined frame based on motion information up to the current frame, as the motion prediction information; and set the readout area based on the estimated motion information.

4. The image processing device according to claim 3, wherein the CPU is further configured to estimate the motion information up to the determined frame based on a determined regularity and the motion information up to the current frame, and the determined regularity includes information associated with at least one of a handshake motion or a walking motion.

5. The image processing device according to claim 1, wherein the CPU is further configured to set a size of the readout area based on an amount of rotation of the estimated cutout area.

6. The image processing device according to claim 1, wherein the CPU is further configured to set a position and a shape of the cutout area.

7. The image processing device according to claim 1, wherein the CPU is further configured to set the cutout area in the readout area of the current frame.

8. The image processing device according to claim 7, wherein the CPU is further configured to set the cutout area at a position closest in a motion direction to a position of a specific cutout area corresponding to motion information up to in the readout area of the current frame.

9. The image processing device according to claim 1, wherein the CPU is further configured to set the cutout area of the current frame based on motion information up to the current frame and information regarding the readout area of the current frame.

10. The image processing device according to claim 1, wherein the CPU is further configured to cut out the partial image of the cutout area from the readout image.

11. The image processing device according to claim 1, wherein the CPU is further configured to:

control an image sensor to image a subject; and obtain the readout image, wherein the readout image is an imaged image obtained in the readout area of the imaging area of the image sensor.

12. The image processing device according to claim 11, wherein the CPU is further configured to supply information regarding the readout area to the image sensor, and the image sensor images the subject and generates the imaged image of the readout area based on the supplied information regarding the readout area.

13. The image processing device according to claim 12, wherein the CPU is further configured to supply the information regarding the readout area of a frame, subsequent to the current frame, to the image sensor, and the information regarding the readout area is supplied during a vertical blanking period.

14. The image processing device according to claim 11, wherein the CPU is further configured to obtain information regarding the readout area together with the readout image.

15. The image processing device according to claim 11, further comprising the image sensor.

16. The image processing device according to claim 1, wherein the CPU is further configured to:

obtain measurement data related to a motion of an image sensor and a posture of the image sensor;

estimate the motion prediction information based on the measurement data related to the motion of the image sensor and the posture of the image sensor; and set the readout area based on the estimated motion prediction information.

17. The image processing device according to claim 1, wherein the CPU is further configured to:

detect a motion vector between frames of an image; and set the readout area based on the detected motion vector.

18. An image processing method, comprising:

estimating a cutout area in a determined frame based on motion prediction information for the determined frame, wherein the determined frame is subsequent to a current frame;

setting, for the current frame, a readout area in an imaging area based on the estimated cutout area, wherein the readout area includes the estimated cutout area, and the imaging area includes a plurality of pixels;

obtaining a readout image based on the readout area of the current frame; and setting the cutout area to cut out a partial image from the readout image.

19. An image processing system, comprising:

an imaging device configured to image a subject; and an image processing device configured to execute an image processing operation, wherein the image processing device comprises a central processing unit (CPU) configured to:

estimate a cutout area in a determined frame based on motion prediction information for the determined frame, wherein the determined frame is subsequent to a current frame;

set, for the current frame, a readout area in an imaging area based on the estimated cutout area, wherein the readout area includes the estimated cutout area, and the imaging area includes a plurality of pixels;

obtain a readout image based on the readout area of the current frame; and set the cutout area to cut out a partial image from the readout image.

\* \* \* \* \*